United States Patent
Kinoshita

(10) Patent No.: US 11,325,591 B2
(45) Date of Patent: May 10, 2022

(54) SYSTEM AND METHOD FOR TELEOPERATION SERVICE FOR VEHICLE

(71) Applicant: Honda Motor Co., Ltd., Tokyo (JP)

(72) Inventor: Shuhei Kinoshita, Sunnyvale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 185 days.

(21) Appl. No.: 16/295,229

(22) Filed: Mar. 7, 2019

(65) Prior Publication Data
US 2020/0282980 A1 Sep. 10, 2020

(51) Int. Cl.
| | |
|---|---|
| *B60W 30/09* | (2012.01) |
| *B60W 40/04* | (2006.01) |
| *B60W 40/06* | (2012.01) |
| *B60W 40/08* | (2012.01) |
| *G01C 21/34* | (2006.01) |
| *G06V 20/56* | (2022.01) |
| *G06V 20/59* | (2022.01) |

(52) U.S. Cl.
CPC ............ *B60W 30/09* (2013.01); *B60W 40/04* (2013.01); *B60W 40/06* (2013.01); *B60W 40/08* (2013.01); *G01C 21/3407* (2013.01); *G06V 20/56* (2022.01); *G06V 20/597* (2022.01); *B60W 2040/0818* (2013.01)

(58) Field of Classification Search
CPC ......... B60W 2040/0818; B60W 30/09; B60W 40/04; B60W 40/06; B60W 40/08; G06K 9/00791; G06K 9/00845; G01C 21/3407
See application file for complete search history.

(56) References Cited

U.S. PATENT DOCUMENTS

| | | | |
|---|---|---|---|
| 9,359,018 B2 * | 6/2016 | Lagassey | H04W 40/02 |
| 9,494,935 B2 | 11/2016 | Okumura et al. | |
| 9,690,290 B2 | 6/2017 | Prokhorov | |
| 9,910,441 B2 | 3/2018 | Levinson et al. | |
| 9,933,779 B2 | 4/2018 | Ross et al. | |
| 10,209,708 B2 * | 2/2019 | Hoye | B60W 50/10 |
| 10,268,191 B1 * | 4/2019 | Lockwood | G05D 1/0027 |
| 10,315,665 B2 * | 6/2019 | Halder | B60W 10/20 |
| 10,546,441 B2 * | 1/2020 | Joao | G07C 9/00896 |

(Continued)

FOREIGN PATENT DOCUMENTS

JP 2018063615 A 4/2018

*Primary Examiner* — Hunter B Lonsberry
*Assistant Examiner* — Daniel L Greene
(74) *Attorney, Agent, or Firm* — American Honda Motor Co., Inc.; Aaron Fong

(57) ABSTRACT

A vehicle control system to provide driving assistance for a vehicle include a plurality of sensors and circuitry. The plurality of sensors captures one or more signals associated with the vehicle. The circuitry identifies a trigger input to change a current operation mode of the vehicle to a teleoperation mode of the vehicle. The circuitry further transmits, in the teleoperation mode, the captured one or more signals to a teleoperation server of a plurality of teleoperation servers. The circuitry further receives, in the teleoperation mode, one or more vehicular instructions from the teleoperation server based on the transmitted one or more signals. The circuitry further controls, in the teleoperation mode, at least one component of the vehicle based on the received one or more vehicular instructions to control movement of the vehicle.

22 Claims, 9 Drawing Sheets

(56) References Cited

U.S. PATENT DOCUMENTS

| | | | |
|---|---|---|---|
| 2007/0087756 A1* | 4/2007 | Hoffberg | G06Q 30/0201 |
| | | | 455/450 |
| 2016/0288708 A1* | 10/2016 | Chang | G06V 20/597 |
| 2017/0057507 A1* | 3/2017 | Gordon | B60W 30/16 |
| 2017/0192426 A1 | 7/2017 | Rust | |
| 2018/0095457 A1* | 4/2018 | Lee | G05D 1/0061 |
| 2018/0101170 A1* | 4/2018 | Cawley | G05D 1/0061 |
| 2018/0118219 A1* | 5/2018 | Hiei | B60W 40/09 |
| 2018/0164804 A1 | 6/2018 | Hou et al. | |
| 2018/0174457 A1* | 6/2018 | Taylor | G08G 1/096741 |
| 2018/0224850 A1 | 8/2018 | Kroop et al. | |
| 2018/0257643 A1 | 9/2018 | Kroop et al. | |
| 2018/0267537 A1 | 9/2018 | Kroop et al. | |
| 2019/0064805 A1* | 2/2019 | Frazzoli | G05D 1/0061 |
| 2019/0066409 A1* | 2/2019 | Moreira da Mota | |
| | | | G07C 5/0808 |
| 2020/0062267 A1* | 2/2020 | Magzimof | B60W 60/005 |
| 2020/0207358 A1* | 7/2020 | Katz | G06F 3/017 |
| 2020/0242421 A1* | 7/2020 | Sobhany | B60W 40/08 |
| 2021/0116907 A1* | 4/2021 | Altman | B60W 60/0015 |

\* cited by examiner

SYSTEM AND METHOD FOR TELEOPERATION SERVICE FOR VEHICLE

BACKGROUND

Many new technologies are being developed to control autonomous vehicle driving. Typically, the autonomous vehicle may include a variety of sensors which monitor different situations inside or outside the vehicle. Based on monitored situations, a controller of the autonomous vehicle automatically may control different operations (for example acceleration, steering, breaking) of the vehicle. However, in real-time environment, there may be certain situations in which the autonomous vehicle may not understand or is not trained. Example of such situations may be difficult road conditions, heavy traffic, incorrect navigation data, etc. In such situations, the autonomous vehicle may either stop, take certain decisions which may not be cost-effective or may be undesired by an occupant in the vehicle. Thus, an advanced autonomous vehicle system may be desired which may monitor various real-time situations and accordingly provide efficient and cost-effective solutions.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A vehicle control system to provide driving assistance for a vehicle may include a plurality of sensors and circuitry coupled with the plurality of sensors. The plurality of sensors may be configured to capture one or more signals associated with the vehicle. The circuitry may be configured to identify a trigger input to change a current operation mode of the vehicle to a teleoperation mode of the vehicle based on the captured one or more signals. The circuitry may be further configured to transmit, in the teleoperation mode, the captured one or more signals to a teleoperation server of a plurality of teleoperation servers. The circuitry may be further configured to receive, in the teleoperation mode, one or more vehicular instructions from the teleoperation server based on the transmitted one or more signals. The circuitry may be further configured to control, in the teleoperation mode, at least one component of the vehicle based on the received one or more vehicular instructions to control movement of the vehicle.

A teleoperation server to provide teleoperation service may include a memory and circuitry coupled with the memory. The memory may be configured to store vehicle information of a plurality of vehicles and teleoperation information of a plurality of teleoperation devices. The circuitry may be configured to receive a teleoperation request from an information processing apparatus, wherein the teleoperation request may include route information indicating a starting point and a destination point of a journey to be started. The circuitry may be further configured to select a vehicle from the plurality of vehicles based on a first analysis of the received teleoperation request and the stored vehicle information. The circuitry may be further configured to select a teleoperation device from the plurality of teleoperation devices based on a second analysis of the received teleoperation request and the stored teleoperation information. The circuitry may be further configured to control a communication between the selected vehicle and the selected teleoperation device. The circuitry may be further configured to receive a response indicating a completion of the journey from the information processing apparatus, and calculate a first incentive value for the selected vehicle and a second incentive value for the selected teleoperation device based on the received response.

A teleoperation device may include a display screen and circuitry coupled to the display screen. The circuitry may be configured to receive a teleoperation request to provide a driving assistance for a vehicle, wherein the teleoperation request may include identification information of the vehicle. The circuitry may be further configured to receive one or more signals captured by a plurality of sensors associated with the vehicle. The circuitry may be further configured to control the display screen to display the received one or more signals and receive one or more control inputs based on the displayed one or more signals. The circuitry may be further configured to transmit one or more vehicular instructions to a vehicle control system of the vehicle based on the received one or more control inputs.

DETAILED DESCRIPTION

Figure 1:
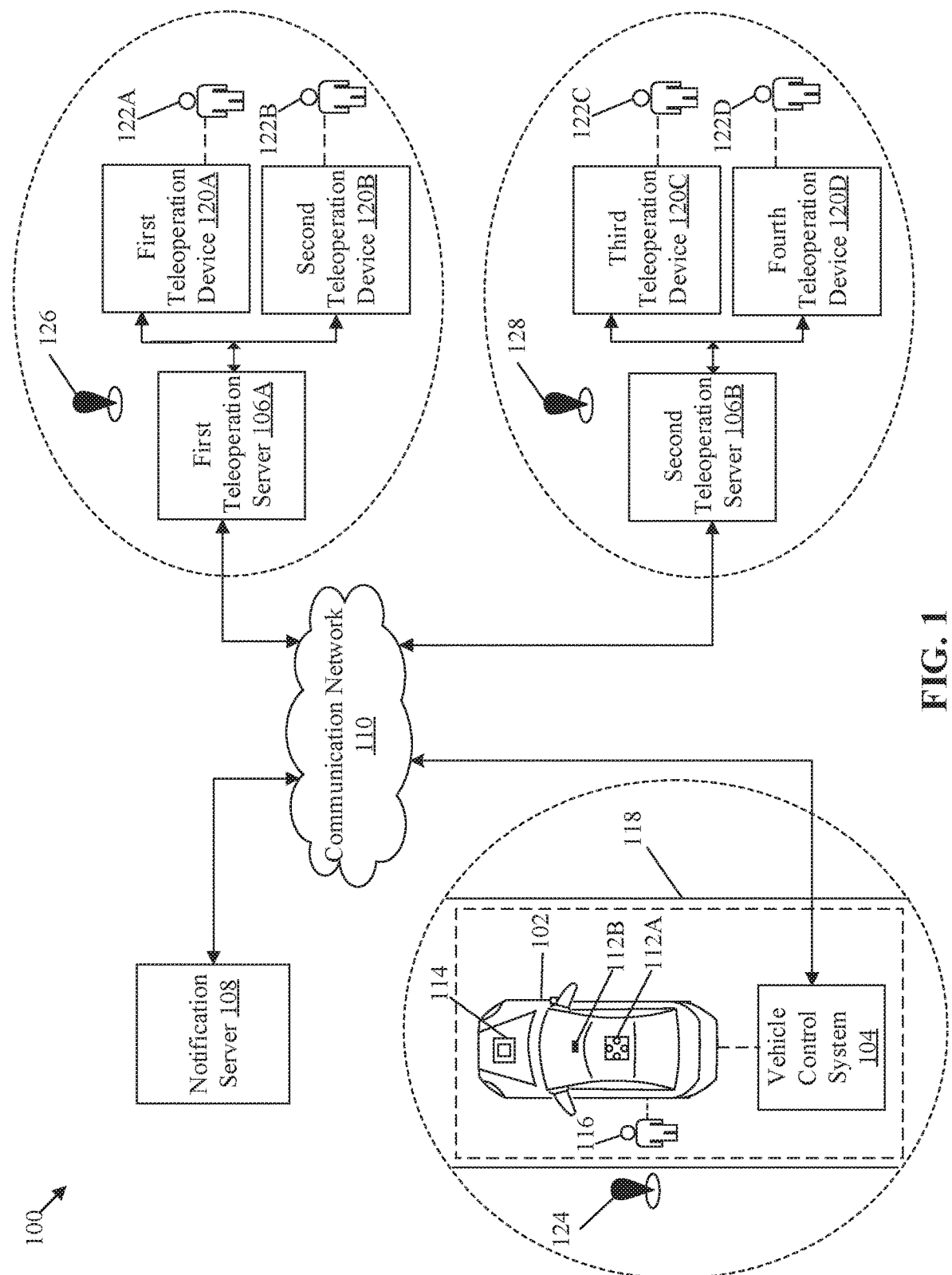
FIG. 1 is a block diagram that illustrates an exemplary first network environment for a vehicle control system to provide driving assistance for a vehicle, in accordance with an embodiment of the disclosure.

Various embodiments of the present disclosure may be found in a vehicle control system to provide driving assistance for a vehicle. The vehicle control system associated with the vehicle may include a plurality of sensors. The plurality of sensors may capture different images of the surroundings of the vehicle to determine various situations which may be difficult for the vehicle to handle in an autonomous operation mode. The plurality of sensors may also capture different images of an interior view of the vehicle and biometric data of a driver of the vehicle to determine an emotional state of the driver. The vehicle control system may determine the emotional state (for example nervousness, sleepy, unconfident, stressed) to detect whether the driver may be able to handle the vehicle correctly or not. Based on the detection of various driving situations and the emotional or health status of the driver, the vehicle control system may switch a current operation mode (i.e. autonomous or driver mode) to a teleoperation mode, where the vehicle may be controlled by a teleoperation device operated by an associated teleoperator.

The disclosed vehicle control system may select the teleoperation device or the teleoperator which may be located in a different geo-location (for example different country) than a current geo-location of the vehicle considering that a driving cost at the geo-location of the teleoperation device or the teleoperator may be less. The disclosed vehicle control system may also select the teleoperation device or the teleoperator which may be working in same time-zone as that of the vehicle or time zone at which the teleoperation device or the teleoperator are currently available. The disclosed vehicle control system may also verify driving license information of the teleoperators such that the teleoperators which have a valid driving license of the geo-location of the vehicle are selected to provide a teleoperation service to the vehicle. Thus, the vehicle control system dynamically monitors real-time situations (i.e. which may be difficult for the vehicle to handle or may lead to accidents) in the autonomous/driver mode, and automatically switches to the teleoperation mode in which available and licensed teleoperators remotely control different operations of the vehicle at lesser driving cost.

Various embodiments of the present disclosure may also be found in a teleoperation server to provide driving assistance for a vehicle. The teleoperation server may receive a teleoperation request from a user who may want to travel from a start point to a destination point using the teleoperation service. The teleoperation server may select the vehicle (for example an autonomous vehicle) and a teleoperation device/teleoperator to remotely drive the selected vehicle from the start point to the destination point. The selection of the teleoperator may be based on the geo-location of the teleoperator where that the cost of driving is lesser. Based on the cost saving, the teleoperation server may provide sufficient discounts to the user. The teleoperation service may further provide incentives (for example rental fee and driving fee) to an owner of the selected vehicle and to the teleoperator who remotely controlled the vehicle and provided the teleoperation service to the vehicle as well as to the user.

FIG. 1 is a block diagram that illustrates an exemplary first environment for a vehicle control system to provide driving assistance for a vehicle, in accordance with an embodiment of the disclosure. With reference to FIG. 1, there is shown a network environment 100. The network environment 100 may include a vehicle 102 that may travel along a road 118. The network environment 100 may further include a plurality of teleoperation servers 106A-106B, a navigation server 108, and a communication network 110. The vehicle 102 may include a vehicle control system 104, a plurality of sensors 112A-112B, and a component 114 (for example engine). There is further shown a user 116 associated with the vehicle 102. The user 116 may be a rider or a driver of the vehicle 102. There may be more than one occupant in the vehicle 102. In some embodiments, the user 116 may be an owner of the vehicle 102.

As per FIG. 1, the plurality of teleoperation servers 106A-106B may include a first teleoperation server 106A and a second teleoperation server 106B. The vehicle 102, the plurality of teleoperation servers 106A-106B, and the navigation server 108 may communicate with each other through the communication network 110. The first teleoperation server 106A may be associated with a first plurality of teleoperation devices 120A-120B. The first plurality of teleoperation devices 120A-120B may be associated or operated by a first plurality of teleoperators 122A-122B. Similarly, the second teleoperation server 106B may be associated with a second plurality of teleoperation devices 120C-120D. The second plurality of teleoperation devices 120C-120D may be associated or operated by a second plurality of teleoperators 122C-122D.

For the sake of brevity, only two teleoperation servers and teleoperation devices have been shown in FIG. 1. However, in some embodiments, there may be more than two teleoperation servers communicably coupled with the vehicle 102 and more than two teleoperation devices associated with each teleoperation server, without limiting the scope of the disclosure. It may be noted that the vehicle 102 shown in FIG. 1 is merely an example of a four-wheeler vehicle. The present disclosure may be also applicable to other types of vehicles such as two-wheeler vehicle, three-wheeler vehicle, or vehicle with more than four wheels. A description of other types of vehicles has been omitted from the disclosure for the sake of brevity.

As shown in FIG. 1, the vehicle 102 may be located at a first geo-location 124, the first teleoperation server 106A may be located at a second geo-location 126, and the second teleoperation server 106B may be located at a third geo-location 128. In an embodiment, the first geo-location 124, the second geo-location 126, and the third geo-location 128 may be different from each other. For example, the first geo-location 124, the second geo-location 126, and the third geo-location 128 may be different areas, cities, states or countries.

The vehicle 102 may be a system through which the user 116 may travel along the road 118 from a start point to a destination point. The vehicle 102 may be an autonomous, a semi-autonomous, or a non-autonomous vehicle. Examples of the vehicle 102 may include, but are not limited to, an electric vehicle, a hybrid vehicle, and/or a vehicle that uses a combination of one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. In some embodiments, the vehicle 102 may be sedan-type or hatch-type four-wheeler vehicle.

The vehicle control system 104 may include suitable logic, circuitry, interfaces, and/or code that may configured to control the movement of the vehicle 102. The vehicle control system 104 may include a specialized electronic circuitry that may include an electronic control unit (ECU) processor to control different functions, such as, but not limited to, engine operations, communication operations, and data acquisition from the plurality of sensors 112A-112B. The vehicle control system 104 may be configured to control the plurality of sensors 112A-112B to capture one or more signals associated with the vehicle 102 or the user 116 (in case the user 116 is present in the vehicle 102). The vehicle control system 104 may be further configured to communicate with the plurality of teleoperation servers 106A-106B based on the captured one or more signals. The vehicle control system 104 may be further configured to control different components or part (for example the engine 114) of the vehicle 102 to control the movement of the vehicle 102. The vehicle control system 104 may also be configured to communicate with the navigation server 108 to receive navigation information related to the first geo-location 124. The vehicle control system 104 may control the movement of the vehicle 102 based on the received navigation information.

The plurality of sensors 112A-112B may include suitable logic, circuitry, interfaces, and/or code that may be configured to capture the one or more signals associated with the vehicle 102 or the user 116 (in case the user 116 is present inside the vehicle 102). The plurality of sensors 112A-112B may include a first image capturing device 112A that is configured to capture one or more first images indicating a view of surrounding of the vehicle 102 in a plurality of directions (for example front, rear, left, or right.) The first image capturing device 112A may be configured to capture a 360-degree view of the surrounding of the vehicle 102. In accordance with an embodiment, the first image capturing device 112A may further include a plurality of image sensors (not shown) to capture the 360-degree view of the surroundings of the vehicle 102. Each image sensor of the plurality image sensors may be configured to capture a portion of the 360-degree view of the surroundings of the vehicle. The first image capturing device 112A may be configured to stitch each captured portion of the plurality image sensors to generate the 360-degree view of the surroundings of the vehicle 102.

In accordance with an embodiment, the first image capturing device 112A may be installed on an exterior portion (such as exterior roof) of the vehicle 102. In some embodiments, the first image capturing device 112A may be installed in the interior (such as near one of windshields) of the vehicle 102 to obtain a clear and unhindered 360-degree view of the surroundings of the vehicle 102. In some embodiments, the first image capturing device 112A may be two-dimensional or three-dimensional camera located at a front portion of the vehicle 102 to capture the one or more images of front side of the vehicle. In some embodiments, the vehicle control system 104 may include multiple first image capturing devices situated at different positions of the vehicle 102.

The plurality of sensors 112A-112B may further include a second image capturing device 112B configured to capture one or more second images indicating an interior view of the vehicle 102. The second image capturing device 1126 may be situated inside the vehicle 102 and configured to capture the one or more second images of the user 116 inside the vehicle. The second image capturing device 1126 may be installed at different interior portions of the vehicle 102 to obtain a clear and unhindered field-of-view of the driver or other occupants of the vehicle 102.

Examples of the first image capturing device 112A and the second image capturing device 112B may include, but are not limited to, a 360-degree camera, an omnidirectional camera, a panoramic camera, an action camera, an imaging sensor, a wide-angle camera, digital camera, a closed-circuit television (CCTV) camera, a camcorder, a night-vision camera, a time-of-flight sensor-based camera (ToF camera), and/or other image capturing or devices with 360-degree view capturing capability. The vehicle 102 may include various other types of sensors to measure different parameters (for example temperature, geo-location, vibration, fuel level, coolant level, gear position, pressure, electric voltages, etc.) of the vehicle 102. The description of the other types of sensors of the vehicle 102 has been omitted from the disclosure for the sake of brevity.

The component 114 may be a different part or components of the vehicle control system 104. For example, the component 114 may be an engine which may be configured to control different operations related to the movement of the vehicle 102. For example, different operations may include, but are not limited to, fuel injection, compression, ignition, or emission. Example of the component 114 of the vehicle 102 may include, but are not limited to, a steering system, a braking system, an acceleration system, a gear system, a fuel injection system, an ignition system, a lighting system, an infotainment system, a HVAC system, a power system, a navigation system, or a vehicle sensing system.

Each of the plurality of teleoperation servers 106A-106B may include suitable logic, circuitry, interfaces, and/or code that may be configured to provide teleoperation service to the vehicle 102. In the teleoperation service, each of the plurality of teleoperation servers 106A-106B, may control communication between the vehicle 102 and a teleoperation device (i.e. the first plurality of teleoperation devices 120A-120B and the second plurality of teleoperation devices 120C-120D). Each of the plurality of teleoperation servers 106A-106B may be configured to provide the teleoperation service based on a request received from the vehicle 102 or from an information processing apparatus associated with the user 116.

Each of the plurality of teleoperation servers 106A-106B may store vehicle information of the vehicle 102 for example, but not limited to, identification information, availability information, a current geo-location, or registered owner information. Each of the plurality of teleoperation servers 106A-106B may further store teleoperation information about each of the associated plurality of teleoperation devices (i.e. the first plurality of teleoperation devices 120A-120B or the second plurality of teleoperation devices 120C-120D) or a plurality of teleoperators (i.e. first plurality of teleoperators 122A-122B or the second plurality of teleoperators 122C-122D). The teleoperation information may include, but is not limited to, a current geo-location, time-zone information, availability information, or driving licensing information of each of the teleoperation devices or the teleoperators. In accordance with an embodiment, each of the plurality of teleoperation servers 106A-106B may be configured to calculate a first incentive value for the vehicle 102 (or the user 116) and a second incentive value for a teleoperation device or teleoperator based on the teleoperation operation between the vehicle 102 and the teleoperation device.

In some embodiments, each of the plurality of teleoperation servers 106A-106B may be implemented as a cloud server, which may be utilized to execute various operations through web applications, cloud applications, HTTP requests, repository operations, file transfer, gaming operations, and the like. Examples of the teleoperation servers 106A-106B may include, but are not limited to, a cloud server, a web server, a database server, a file server, an application server, a mainframe server, or a combination thereof.

The teleoperation device (i.e. the first plurality of teleoperation devices 120A-120B or the second plurality of teleoperation devices 120C-120D) may include suitable logic, circuitry, interfaces, and/or code that may be configured to provide one or more vehicular instructions to the vehicle 102 to control the movement or operations of the vehicle 102 remotely. The teleoperation device may be configured to receive a teleoperation request from the vehicle 102 or one of the plurality of teleoperation servers 106A-106B to provide driving assistance to the vehicle 102. The teleoperation device may be further configured to receive the one or more signals captured by the plurality of sensors 112A-112B of the vehicle 102 through the communication network 110 via one of the plurality of teleoperation servers 106A-106B. The teleoperation device may be further configured to transmit the one or more vehicular instruction to the vehicle control system 104 of the vehicle 102 based on the received one or more signals.

The teleoperation device may include control options (shown in FIG. 4) though which the teleoperation device receives one or more control inputs from a teleoperator associated with the teleoperation device. The teleoperation device may be situated at different geo-location (for example different city, state, country) as compared to the current geo-location of the vehicle 102 controlled by the teleoperation device.

The navigation server 108 may include suitable logic, circuitry, interfaces, and/or code that may be configured to provide map information to the vehicle control system 104 of the vehicle 102. The navigation server 108 may be configured to receive current geo-location of the vehicle 102 from the vehicle control system 104 through the communication network 110 and provide the map information based on received current geo-location. The map information may include, but is not limited to, information about different routes, landmarks, places-of-interest (POI), or traffic. In some embodiments, the navigation server 108 may be a base station situated in the current geo-location of the vehicle 102. In some embodiments, navigation server 108 may be implemented as a cloud server, which may be utilized to execute various operations through web applications, cloud applications, HTTP requests, repository operations, file transfer, gaming operations, and the like. Examples of the navigation server 108 may include, but are not limited to, a cloud server, a web server, a database server, a file server, an application server, a mainframe server, or a combination thereof.

The communication network 110 may include a communication medium through which the vehicle control system 104 may communicate with the plurality of sensors 112A-112B, the first plurality of teleoperation devices 120A-120B, the second plurality of teleoperation devices 120C-120D, and the navigation server 108. Examples of the communication network 110 may include, but are not limited to, the Internet, a cloud network, a Long Term Evolution (LTE) network, a Wireless Local Area Network (WLAN), a Local Area Network (LAN), a telephone line (POTS), and/or a Metropolitan Area Network (MAN). Various devices in the network environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols, or a combination thereof.

In operations, the plurality of sensors 112A-112B may be configured to capture the one or more signals associated with the vehicle 102 or the user 116. For example, the first image capturing device 112A may capture the one or more first images (as the one or more signals) indicating the view of the surrounding of the vehicle 102 in the plurality of directions (for example 360-degree view). The vehicle 102 may be operating in an autonomous operation mode, where the movement of the vehicle 102 may not be controlled by the user 116 (as driver), but controlled automatically based on the captured one or more first images of the surrounding of the vehicle 102. In another example, the vehicle 102 may be working in a driver operation mode in which the vehicle 102 may be operated by the user 116. In such case, the second image capturing device 112B may capture the one or more second images (as the one or more signals) indicating an interior view of the vehicle 102. In some embodiments, the second image capturing device 112B may capture the one or more second images of the user 116 (i.e. driver).

The vehicle control system 104 may be further configured to identify a trigger input to change a current operation mode (for example, the autonomous mode or the driver mode) of the vehicle 102 to a teleoperation mode. The vehicle control system 104 may be configured to identify the trigger input based on the one or more first images captured by the first image capturing device 112A or based on the one or more second images captured by the second image capturing device 112B. The trigger input may refer to difficult driving situations (for example mountain driving, heavy traffic zone, accidental driving zone, a nervous emotional state of the driver, or a sleepy state of the driver) in which the operation mode of the vehicle 102 should be transferred to the teleoperation mode in which the vehicle 102 may be remotely driven by the teleoperator using the associated teleoperation device. Certain examples of the difficult driving situations which may initiate the trigger input are described in detail, for example, in FIGS. 3A and 3B.

In the teleoperation mode, the vehicle control system 104 may be configured to transmit the captured one or more signals (i.e. the one or more first images or one or more second images) to a teleoperation server (for example the first teleoperation server 106A) of the plurality of teleoperation servers 106A-106B, through the communication network 110. In some embodiments, the one or more signals may refer to various data measured by other sensors within the vehicle 102. Example of such data are, but are not limited to, temperature, geo-location, vibration level, fuel level, engine-oil level, coolant level, gear position, pressure, or electric voltage level of different components or parts of the vehicle 102. The geo-locations of the vehicle 102 and the first teleoperation server 106A may be different from each other.

The first teleoperation server 106A may be configured to select a teleoperation device (e.g. a first teleoperation device 120A) of the first plurality of teleoperation devices 120A-120B to remotely control or drive the vehicle 102. In an embodiment, the first teleoperation server 106A may be configured to select the first teleoperation device 120A based on availability of the first teleoperation device 120A among the first plurality of teleoperation devices 120A-120B. In another embodiment, the first teleoperation server 106A may select the first teleoperation device 120A based on licensing information of a first teleoperator 122A associated with the first teleoperation device 120A. The licensing information may indicate details of driving license of the first teleoperator 122A. For example, the first teleoperator 122A who has a valid driving license to drive the vehicle 102 in the country or state associated with the first geo-location 124 of the vehicle 102 may be selected to remotely drive the vehicle 102. The first teleoperator 122A may be situated at the second geo-location 126 (state or country) different from the first geo-location 124. In some embodiments, the vehicle control system 104 may be configured to select one of the plurality of teleoperation servers 106A-106B based on the geo-locations. For example, the location of one of the plurality of teleoperation servers 106A-106B may be selected where the cost of driving is less as compared to the cost of driving in the first geo-location 124 of the vehicle 102.

The selected teleoperation server (for example the first teleoperation server 106A) may be further configured to receive the one or more captured signals from the vehicle control system 104 and provide the received one or more signals to the first teleoperation device 120A. The first teleoperation device 120A may render the received one or more signals captured by the vehicle control system 104 on a display screen (shown in FIG. 4). Thus, the first teleoperator 122A may be able to visualize different images (i.e. front, rear, left, right) of the surroundings of the vehicle control system 104, different images of the interior of the vehicle 102, and various data captured in the one or more signals. Further, the first teleoperator 122A may operate the first teleoperation device 120A to remotely control the movement of the vehicle 102 based on the rendered one or more signals. The first teleoperation device 120A may include one or more control options to remotely control the vehicle control system 104. Examples of the control options are, but are not limited to, steering, brakes, accelerator, clutch, navigation system, lighting control, infotainment system, HVAC control system, or other vehicle control systems known in the art. The control options of the first teleoperation device 120A are described in detail, for example, in FIG. 4.

The vehicle control system 104 may be further configured to receive, in the teleoperation mode, the one or more vehicular instructions from the first teleoperation server 106A or the first teleoperation device 120A based on operations performed on the one or more control options of the first teleoperation device 120A. The vehicle control system 104 may be further configured to control different components or parts of the vehicle 102 based on the received one or more vehicular instructions to control the movement of the vehicle 102. Thus, the disclosed vehicle control system 104 provides a dynamic monitoring of difficult driving situations (i.e. occurred outside or inside the vehicle 102) based on the captured one or more signals and automatically switches the current operation mode (for example the autonomous mode or driver mode) into the teleoperation mode, where the detected driving situation may be effectively handled by the first teleoperator 122A of the first teleoperation device 120A.

Further, the first teleoperation device 120A may be selected based on various factors, for example, time zone of the geo-location of the first teleoperation device 120A, licensing information of the first teleoperator 122A, and cost of driving a vehicle at a particular country or state associated with the first teleoperation device 120A. Thus, based on the consideration of such selection factors, the disclosed vehicle control system 104 provides easy availability of the licensed teleoperators at a lesser cost which may be desired by the vehicle 102 (as autonomous vehicle).

In some embodiments, the vehicle control system 104 may include an artificial intelligent (AI) engine (not shown) which may learn how the difficult driving situations were handled by the first teleoperator 122A of the first teleoperation device 120A such that the same driving situations can be handled by the vehicle control system 104 in the autonomous mode in future. The vehicle control system 104 may learn the automatic handling of the difficult driving situations based on monitoring of the vehicular instructions received from the first teleoperation device 120A and control instructions based on which different components/parts of the vehicle 102 are controlled.

Figure 2:
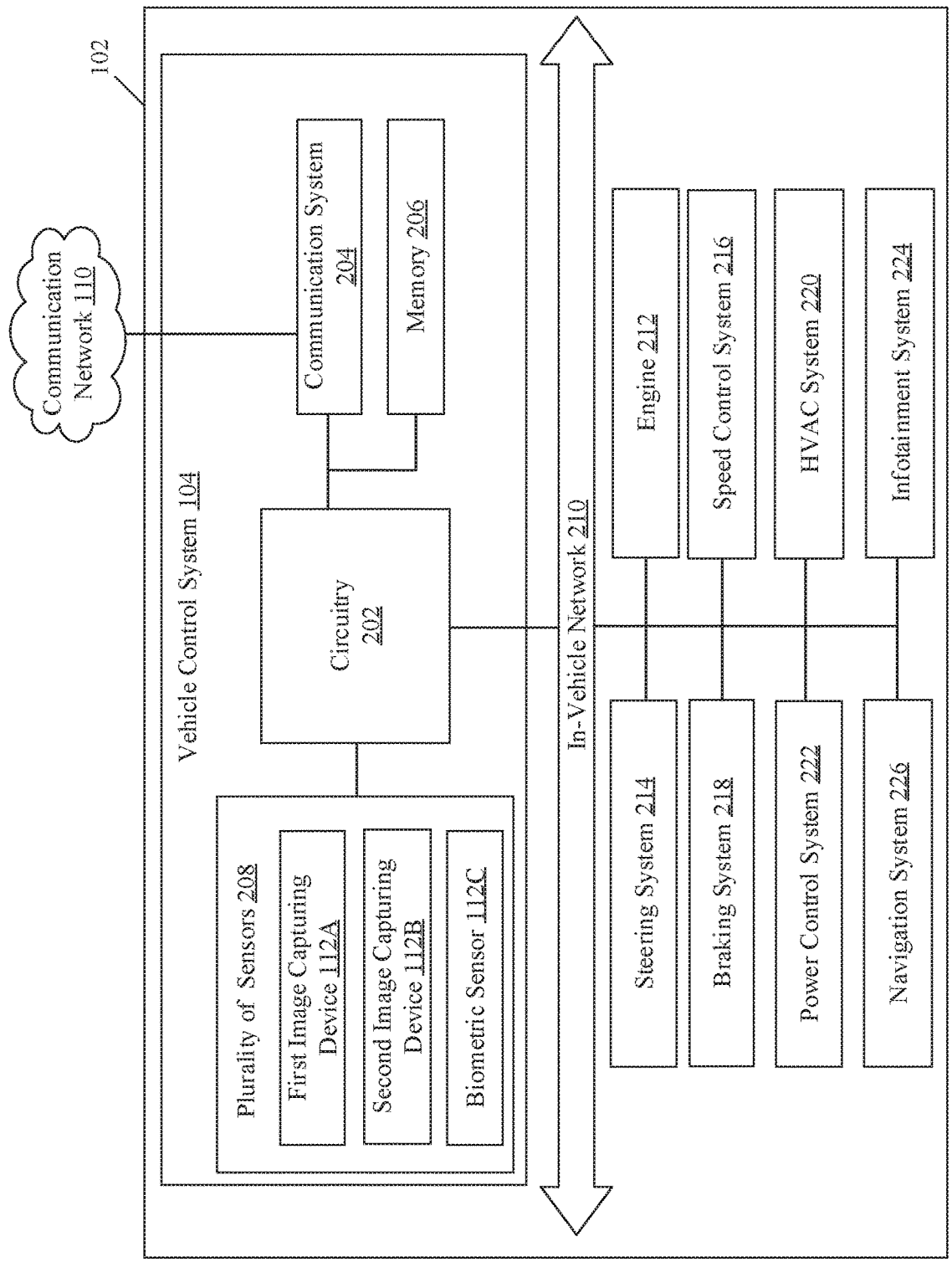
FIG. 2 is a block diagram that illustrates an exemplary vehicle control system to provide driving assistance for a vehicle, in accordance with an embodiment of the disclosure.

FIG. 2 is a block diagram that illustrates an exemplary vehicle control system to provide driving assistance for a vehicle, in accordance with an embodiment of the disclosure. FIG. 2 is explained in conjunction with elements from FIG. 1. With reference to FIG. 2, there is shown the vehicle 102. The vehicle 102 may include the vehicle control system 104. The vehicle control system 104 may further include circuitry 202, a communication system 204, a memory 206, and a plurality of sensors 208. The plurality of sensors 208 may include the first image capturing device 112A, the second image capturing device 112b, a biometric sensor 112C. The circuitry 202 may be connected with the communication system 204, the memory 206, and the plurality of sensors 208 through wired or wireless connections.

As shown in FIG. 2, the vehicle 102 may further include an in-vehicle network 210, an engine 212, a steering system 214, a speed control system 216, a braking system 218, a HVAC system 220, a power control system 222, an Infotainment system 224, and a navigation system 226. The vehicle control system 104 may be connected to each of the engine 212, the steering system 214, the speed control system 216, the braking system 218, the HVAC system 220, the power control system 222, the Infotainment system 224, and the navigation system 226 through the in-vehicle network 210.

The circuitry 202 may include suitable logic, circuitry, interfaces, and/or code that may be configured to execute a set of instructions stored in the memory 206. The circuitry 202 may be configured to control the communication system 204, the memory 206, the plurality of sensors 208, the engine 212, the steering system 214, the speed control system 216, the braking system 218, the HVAC system 220, the power control system 222, the Infotainment system 224, and the navigation system 226 to perform different operations based on the set of instructions. The circuitry 202 may be configured to control the movement of the vehicle 102 based on the one or more signals by the captured plurality of sensors 208. The circuitry 202 may identify the trigger input to change the current operation mode of the vehicle 102 to the teleoperation mode of the vehicle based on the captured one or more signals. The circuitry 202 may control the communication system 204 to transmit the captured one or more signals to one of the plurality of teleoperation servers 106A-106B in the teleoperation mode and receive one or more vehicular instructions from one of the plurality of teleoperation servers 106A-106B based on the transmitted one or more signals. In the teleoperation mode, the circuitry 202 may be further configured to control at least one component of the vehicle 102 based on the received one or more vehicular instructions to control movement of the vehicle 102.

The circuitry 202 may be implemented based on a number of processor technologies known in the art. Examples of the circuitry 202 may include a Graphical Processing Unit (GPU), a Central Processing Unit (CPU), an x86-based processor, an x64-based processor, a Reduced Instruction Set Computing (RISC) processor, an Application-Specific Integrated Circuit (ASIC) processor, a Complex Instruction Set Computing (CISC) processor, and/or other hardware processors.

The communication system 204 may include suitable logic, circuitry, interfaces, and/or code that may be configured to enable communication between the circuitry 202, the plurality of teleoperation servers 106A-106B, the first plurality of teleoperation devices 120A-120B, the second plurality of teleoperation devices 120C-120D or the navigation server 108 via the communication network 110. The communication system 204 may implement by use of various known technologies to support wired or wireless communication of the vehicle control system 104 with the communication network 110. The communication system 204 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer.

The memory 206 may include suitable logic, circuitry, interfaces, and/or code that may be configured to store a set of instructions executable by the circuitry 202. The memory 206 may be configured to store vehicle information (for example model number, year of manufacturing, or part number of different components/parts) of the vehicle 102. The memory 206 may route information, including the start point and destination point. The route information may indicate a route to be followed by the vehicle 102. The memory 206 may also store map information received from the navigation server 108. The map information may include traffic information or emergency information associated with the route to be followed by the vehicle 102. The memory 206 may also store the one or more first images captured by the first image capturing device 112A, the one or more second images captured by the second image capturing device 112б, and the data measured by other sensors within the vehicle 102. The memory 206 may also store past driving information of the user 116 (as driver) associated with the vehicle 102. The memory 206 may also store time-zone information of each of the plurality of teleoperation servers 106A-106B, and each of the plurality of teleoperation devices associated with each of the plurality of teleoperation servers 106A-106B. The memory 206 may also store cost of driving at different geo-locations (i.e. the first geo-location 124, the second geo-location 126, the third geo-location 128) or cost of driving by the first plurality of teleoperation devices 120A-120B, the second plurality of teleoperation devices 120C-120D. Examples of implementation of the memory 206 may include, but are not limited to, Random Access Memory (RAM), Read Only Memory (ROM), Hard Disk Drive (HDD), a Solid-State Drive (SSD), a CPU cache, and/or a Secure Digital (SD) card.

The functions of the plurality of sensors 208 may be same as the functions of the plurality of sensors 112A-112B described in FIG. 1. The description of the plurality of sensors 208 is omitted from the disclosure for the sake of brevity. The plurality of sensors 208 may also include the biometric sensor 112C. The biometric sensor 112C may be configured to capture biometric data of the user 116 present in the vehicle 102. Examples of the biometric sensor 112C may include, but are not limited to, a pulse rate sensor, a breath rate sensor, a body temperature sensor, a heartbeat sensor, a blood-flow sensor, an IoT sensor or a skin conductance sensor, or other specialized sensors to measure different emotions states aroused in the user 116. Examples of different emotional state may include, but are not limited to, a happy emotion, a sad emotion, an angry emotion, a calm emotion, a fear emotion, an excited emotion, a confused emotion, a stressed emotion, a disgusted emotion, a surprised emotion, an excitement emotion, or a scared emotion. In some embodiments, the biometric sensor 112C may be non-invasively attached to body of the user 116. In some embodiments, the biometric sensor 112C may be a wearable device worn by the user 116 (for example as shown in FIG. 3B). In some embodiments, the biometric sensor 112C may be installed in a 3D space inside the vehicle 102, to collectively monitor the biometric data of the user 116.

Although in FIG. 2, the plurality of sensors 208 are integrated within the vehicle control system 104; however, in some embodiments, the plurality of sensors 208 may not be integrated in the vehicle control system 104, without a deviation from the scope of the disclosure. In such situations, the plurality of sensors may be integrated inside the vehicle 102 and communicably coupled with the vehicle control system 104. The vehicle control system 104 may act as a specialized electronic circuitry that may include an electronic control unit (ECU) processor to control different functions, such as, but not limited to, engine operations, communication operations, and data acquisition from the plurality of sensors 208 of the vehicle 102. The ECU processor may be configured to control the plurality of sensors 208 to acquire the one or more signals associated with the vehicle 102 through the in-vehicle network 210 of the vehicle 102.

Other examples of the vehicle control system 104 in such situation (i.e. where the plurality of sensors 208 are not integrated within the vehicle control system 104) may include, but are not limited to a microcontroller, a Reduced Instruction Set Computing (RISC) processor, an Application-Specific Integrated Circuit (ASIC) processor, a Complex Instruction Set Computing (CISC) processor, a microcontroller, a central processing unit (CPU), a graphics processing unit (GPU), a state machine, and/or other processors or circuits.

The in-vehicle network 210 may include a medium through which the circuitry 202 may communicate with the engine 212, the steering system 214, the speed control system 216, the braking system 218, the HVAC system 220, the power control system 222, the Infotainment system 224, and the navigation system 226 of the vehicle 102. Various devices or components in the vehicle 102 may be configured to connect to the in-vehicle network 210, in accordance with various wired and wireless communication protocols. Examples of the wired and wireless communication protocols for the in-vehicle network 210 may include, but are not limited to, a vehicle area network (VAN), a CAN bus, Domestic Digital Bus (D2B), a Transmission Control Protocol and Internet Protocol (TCP/IP), Bluetooth (BT) communication protocol, Time-Triggered Protocol (TTP), FlexRay, IEEE 1394, Carrier Sense Multiple Access With Collision Detection (CSMA/CD) based data communication protocol, Inter-Integrated Circuit ($I^2C$), Inter Equipment Bus (IEBus), Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

The engine 212 may be configured to control the movement of the vehicle 102 based on control signals received from the vehicle control system 104. The engine 212 may be an internal combustion engine with may perform operations, for example, fuel injection, compression, ignition, emission to power and drive the vehicle 102. The engine 212 may include various parts, for example, but are not limited to, a crankshaft, a cylinder, a spark plug, a piston, camshaft, a valve, combustion chamber, etc. In some embodiments, the engine 212 may include a motor in case of an electric vehicle. The engine 114 may be two-stroke or four-stroke internal combustion engines. The engine 212 may include either one, two, three, four, or six cylinders. A description of various parts of the engine 212 has been omitted from the disclosure for the sake of brevity.

The steering system 214 may be configured to receive the control signals commands from the circuitry 202 and control directions (left or right) of the movement of the vehicle control system 104. The steering system 214 may include a steering wheel and/or an electric motor (provided for a power-assisted steering) that may be used by a driver to control movement of the vehicle 102 in manual mode or a semi-autonomous mode. The movement or steering of the vehicle 102 may be automatically controlled when the vehicle 102 is in autonomous mode. Examples of the steering system 214 may include, but are not limited to, an autonomous steering control, a power-assisted steering system, a vacuum/hydraulic-based steering system, an electro-hydraulic power-assisted system (EHPAS), or a "steer-by-wire" system, or an autonomous steering system, known in the art.

The speed control system 216 may be configured to control acceleration or deacceleration of the vehicle 102 based on the control signals received from the vehicle 102. The control signals may be generated based on detection of one or more obstacles in front of the vehicle 102 by the capture of the one or more first images. The speed control system 216 may be configured to control the speed of the vehicle 102 based on RPM (rotation per minute) of the engine 212. The speed control system 216 may be configured to control the speed of the vehicle 102 based on the throttle of the vehicle 102.

The braking system 218 may be used to stop or slow down the vehicle 102 by application of resistive forces such as electromagnetic and/or frictional forces. The braking system 218 may be configured to receive the control signals from the vehicle control system 104, when the vehicle 102 is in an autonomous mode or a semi-autonomous mode. In some embodiments, the braking system 218 may be configured to receive the control signals to stop the vehicle 102, when the vehicle control system 104 preemptively detects an abnormal condition (for example presence of the obstacle in front of the vehicle 102, or an abnormal emotional state of the user 116 as the rider) using the capture of the one or more first images and the second images by the first image capturing device 112A and the second image capturing device 112B, respectively.

The HVAC system 220 may be configured to control, clean, cool, heat, regulate ventilate or dehumidify the air inside the vehicle 102. The HVAC system 220 may be configured to control the flow of the air through different vents (not shown) of the vehicle 102 based on the different control signals received from the vehicle control system 104.

The power control system 222 may control or regulate the power (for example electric power) provided to different components of the vehicle 102. In some embodiments, the power control system 222 may be configured to control or regulate the power based on the control signals received from the vehicle control system 104. The power control system 222 may be communicatively connected to the vehicle control system 104, the plurality of sensors 208, the engine 212, the steering system 214, the speed control system 216, the braking system 218, the HVAC system 220, the Infotainment system 224, and the navigation system 226 to provide the power (i.e. electrical power). The power control system 222 may include a battery (not shown) to store the power. In some embodiments, the power control system 222 may control the generation of the power or charging of the battery based on the movement of the vehicle 102.

The infotainment system 224 may include suitable logic, circuitry, interfaces and/or code that may be configured to render at least an audio-based data, a video-based data or a user interface in the vehicle 102. The infotainment system 224 may be configured to play different audio-based data or video-based data based on the control signals provided by the vehicle control system 104. The audio-based data or the video-based data may be received from one of the plurality of teleoperation servers 106A-106B or the navigation server 108. The infotainment system 224 may be configured to control different lighting system of the vehicle 102 based on the received control signals from the vehicle control system 104. Examples of the infotainment system 224 may include, but are not limited, an entertainment system, a navigation system, a vehicle user interface (UI) system, an Internet-enabled communication system, and other entertainment systems.

The navigation system 226 may include suitable logic, circuitry, interfaces and/or code that may be configured to determine current geo-location of the vehicle 102. The navigation system 226 may be configured to provide the determined geo-location of the vehicle to the navigation server 108, via the communication network 110. The navigation system 226 may render the map information on a display screen (not shown) inside the vehicle 102. The navigation system 226 may be configured to measure a distance travelled by the vehicle 102 based on an electric signal indicative of the determined geo-location. The navigation system may include a location sensor to determine the geo-location of the vehicle 102. Examples of the location sensor, may include, but are not limited to, a Global Navigation Satellite System (GNSS)-based sensor of the vehicle 102. Examples of the GNSS-based sensor may include, but are not limited to, global positioning sensor (GPS), Global Navigation Satellite System (GLONASS), or other regional navigation systems or sensors.

It may be noted that the vehicle 102 may include various components or systems. The description of the other components or systems of the vehicle 102 has been omitted from the disclosure for the sake of brevity.

Figure 3A:
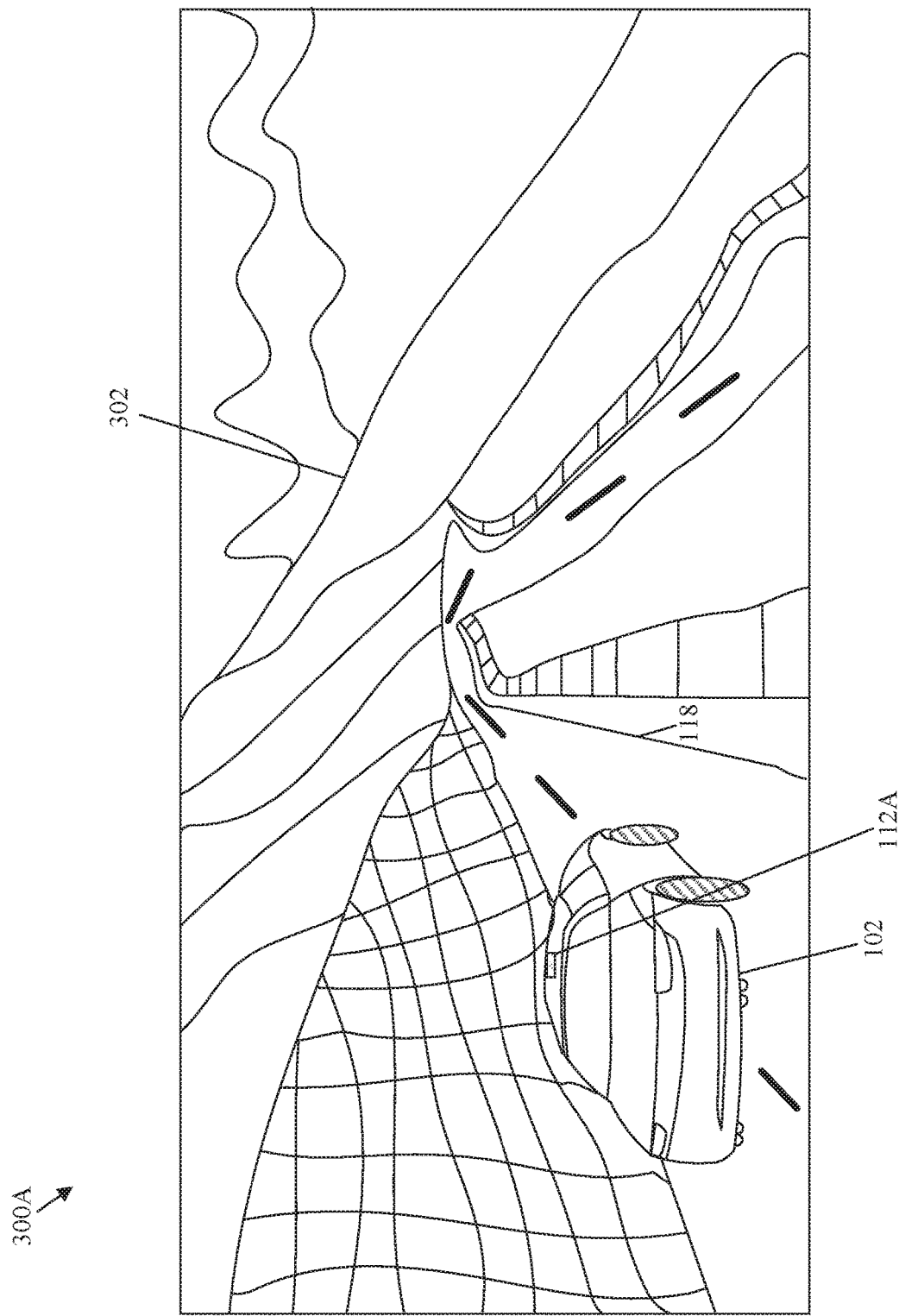
FIG. 3A illustrates a first exemplary scenario to provide driving assistance for a vehicle, in accordance with an embodiment of the disclosure.
Figure 3B:
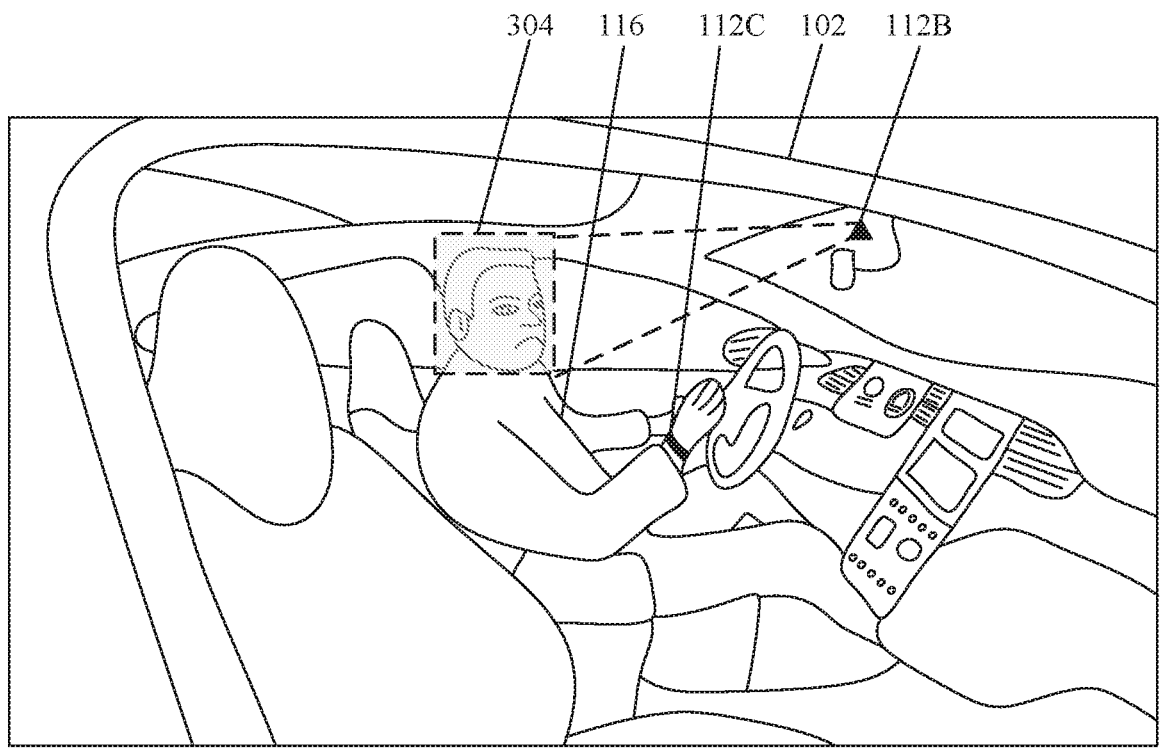
FIG. 3B illustrates a second exemplary scenario to provide driving assistance for a vehicle, in accordance with an embodiment of the disclosure.

FIG. 3A illustrates a first exemplary scenario to provide driving assistance for a vehicle, in accordance with an embodiment of the disclosure. FIG. 3A is explained in conjunction with elements from FIGS. 1 and 2. With reference to FIG. 3A, there is shown a first scenario 300A. In the first scenario 300A, there is shown the vehicle 102 which may be moving on the road 118. The vehicle 102 may include the first image capturing device 112A (for example 360-degree camera) configured to capture the one or more first images indicating the view of the surrounding of the vehicle 102 in the plurality of directions (for example front, rear, left right). The circuitry 202 may be configured to receive the captured one or more first images and perform different images processing techniques on the captured one or more first images to analyze the current situations in the surrounding of the vehicle 102. The circuitry 202 may be configured to detect different objects within the captured one or more first images to analyze the current situations. Different techniques for object detection from the captured images are well known in the art and therefore, the details have been omitted from the disclosure for the sake of brevity.

For example, as shown in FIG. 3A, the circuitry 202 may identify that the vehicle 102 may be moving in a mountain region 302 based on the detection of a mountain terrain in the captured one or more first images. In the mountain region 302, the driving situation for the vehicle 102 (in autonomous mode or in driver mode) may be difficult. Other examples of the difficult situations detected based on the captured one or more first images may include, but are not limited to, heavy traffic condition in the surrounding of the vehicle 102, detection of accident prone areas using signboards, bad road conditions, inappropriate driving style followed by nearby vehicles, or bad weather conditions. In case, the vehicle 102 is operating in the driver mode, the circuitry 202 may retrieve the past driving information of the user 116 (as driver) from the memory 206. The circuitry 202 may be configured to recognize the user 116 based on the analysis of the one or more second images (i.e. captured by the second image capturing device 112B) to retrieve the past driving information of the user 116. The circuitry 202 may determine that the user 116 may have lesser driving experience in the mountain region 302 based on the retrieved past driving information of the user 116. The lesser driving experience in the mountain region 302 of the user 116 may be consider as the difficult driving situation for the user 116 or the vehicle 102.

In some embodiments, the circuitry 202 may be configured to detect the absence of the updated map information (i.e. associated with the current journey) in the memory 206. The circuitry 202 may detect the absence of the map information based on the current geo-location of the vehicle 102. In another embodiment, the circuitry 202 may detect the absence of the map information in case the updated map information is not received from the navigation server 108 within a predefined time interval. The absence of the updated map information for the predefined time interval may be considered as the situation difficult to drive the vehicle 102.

In some embodiments, the received map information from the navigation server 108 may be associated with the current journey of the vehicle 102. The received map information may include traffic information or emergency information of the current geo-location of the vehicle 102. The traffic information may indicate the heavy traffic condition in the current geo-location of the vehicle 102. Similarly, the emergency information may indicate different emergency situations (for example social disturbance, movement of high profile celebrity, bad weather conditions, etc) in the geo-location of the vehicle 102 or in approaching areas of the vehicle 102. The circuitry 202 may be configured to consider such traffic information or emergency information as the situations difficult to drive the vehicle 102 either automatically or manually by low experience driver.

In some embodiments, the circuitry 202 may be configured to detect network conditions to connect or remain connected to a nearby base station associated with the road 118 or the current geo-location of the vehicle 102. The circuitry 202 may measure a quality (received signal strength or channel quality) of data packets or signals (for example map information) received from the nearby base station or the navigation server 108. The circuitry 202 may be configured to detect the bad network conditions or low quality of the received data packets or signals for a predefined time interval (in seconds or minutes) as the situation difficult to drive the vehicle 102.

The circuitry 202 may be further configured to consider the aforementioned difficult situations as the trigger input to change the current operation mode (either the autonomous mode or to driver mode) to the teleoperation mode. In some embodiments, the circuitry 202 may be configured to receive a teleoperation request from one of the plurality of teleoperation servers 106A-106B and may identify the received teleoperation request as the trigger input for the vehicle 102 to change the current operation mode (either the autonomous mode or to driver mode) to the teleoperation mode. The circuitry 202 may be configured to control the speed control system 216 or the braking system 218 to control the speed or stop the vehicle 102 for a suitable time before switching to the teleoperation mode in which the vehicle 102 may be operated by the teleoperator remotely.

In the teleoperation mode, the vehicle 102 may be configured to retrieve the current time-zone of the current geo-location (for example the first geo-location 124) of the vehicle 102 from the memory 206. The vehicle control system 104 or the vehicle 102 may include a real-time clock (not shown) to determine the current time or time-zone associated with the vehicle 102. The circuitry 202 may be configured to select one of the plurality of teleoperation servers 106A-106B based on the time-zone information associated with each of the plurality of teleoperation servers 106A-106B. The circuitry 202 may compare the time-zone or the current time associated with the vehicle 102 and the time-zone or the current time of each of the plurality of teleoperation servers 106A-106B to select one of the plurality of teleoperation servers 106A-106B to provide the teleoperation service to the vehicle 102. Based on the comparison of the time-zones or the current time, the circuitry 202 may determine which of the plurality of teleoperation servers 106A-106B or the teleoperation device or operator may be currently available to provide the teleoperation service to the vehicle 102. For example, in case, the time-zones or the current time of the vehicle 102 and the first teleoperation server 106A are same (say both are in the day time), the circuitry 202 may select the first teleoperation server 106A from the plurality of teleoperation servers 106A-106B to provide the teleoperation service.

In another embodiment, the circuitry 202 may be configured to retrieve the driving cost associated with each of the plurality of teleoperation servers 106A-106B from the memory 206. The driving cost may be predefined by each of the plurality of teleoperation servers 106A-106B to provide the teleoperation service. The driving cost of each of the plurality of teleoperation servers 106A-106B may be different for different geo-locations. For example, the driving cost defined by the first teleoperation server 106A to drive the vehicle 102 in the first geo-location 124 may be lower than the driving cost to drive the vehicle 102 in the second geo-location 126. In some embodiments, the driving costs defined by each of the plurality of teleoperation servers 106A-106B may be different for different types of vehicles. For example, the driving cost to drive a high-end vehicle may be higher than a low-end vehicle. Similarly, the driving costs defined by each of the plurality of teleoperation servers 106A-106B may be different to drive the vehicle 102 in different time periods. For example, the driving cost predefined by the first teleoperation server 106A for a night time may be higher than a day time.

In another embodiment, the driving costs defined by each of the plurality of teleoperation servers 106A-106B may be different based on the types of teleoperation device or driving experience of the teleoperators associated with the corresponding plurality of teleoperation servers 106A-106B. For example, the first teleoperation server 106A may be associated with the teleoperation devices (i.e. the first plurality of teleoperation devices 120A-120B) which may have the higher technical capability to remotely control various types of vehicles. Therefore, the driving cost predefined by the first teleoperation server 106A by a higher as compared to the second teleoperation server 106B. Similarly, the first teleoperation server 106A may be associated with the teleoperators (i.e. the first plurality of teleoperators 122A-122B) which may have higher driving experience and have valid license to drive the vehicle 102 in the first geo-location 124. Therefore, the driving cost predefined by the first teleoperation server 106A may be higher as compared to the second teleoperation server 106B due to higher driving experience of the associated teleoperators.

The circuitry 202 may be configured to select one of the plurality of teleoperation servers 106A-106B based on the predefined driving costs (with respect to different aforementioned factors like geo-location, vehicle type, time period of journey, or driving experience) stored in the memory 206. The circuitry 202 may be configured to select the one of the plurality of teleoperation servers 106A-106B which provide the lowest driving cost in the teleoperation mode. In some embodiments, the circuitry 202 may be configured to select one of the plurality of teleoperation servers 106A-106B that is associated with the teleoperators with higher driving experience or with least accidental record.

In some embodiments, the circuitry 202 may be configured to transmit a teleoperation request to each of the plurality of teleoperation servers 106A-106B, via the communication network 110. The teleoperation request may include, but is not limited to, the current geo-location of the vehicle 102, time-zone of the vehicle 102, time of the journey of the vehicle 102, the destination point of the journey, or the vehicle-type of the vehicle 102. The circuitry 202 may be further configured to receive a teleoperation cost value (for example the driving cost) from each of the plurality of teleoperation servers 106A-106B based on the transmitted teleoperation request. The circuitry 202 may be configured to select one of the plurality of teleoperation servers 106A-106B based on the comparison of each of the teleoperation cost value (for example the driving cost) received from each of the plurality of teleoperation servers 106A-106B. For example, the circuitry 202 may select the first teleoperation server 106A from the plurality of teleoperation servers 106A-106B because the received teleoperation cost value (the driving cost) may be lowest among the teleoperation cost values received from each of the plurality of teleoperation servers 106A-106B.

In some embodiments, the circuitry 202 may be configured to receive the driving licensing information from each of the plurality of teleoperation servers 106A-106B along with the teleoperation cost value. The driving licensing information may be related to the teleoperators associated with each of the plurality of teleoperation servers 106A-106B. The driving licensing information may indicate in which geo-location (country or state) the associated teleoperator has a valid driving license to drive the vehicle 102. For example, the first teleoperator 122A of the first teleoperation server 106A may have an international driving license and the third teleoperator 122C of the second teleoperation server 106B may not have a driving license to drive the vehicle 102 in the current geo-location (for example the first geo-location 124) of the vehicle 102. Thus, the circuitry 202 may be configured to select the first teleoperation server 106A from the plurality of teleoperation servers 106A-106B based on a determination that the received driving licensing information of the first teleoperator 122A is compliant with the current geo-location of the vehicle 102 and a geo-location of the destination point of the route to be taken by the vehicle 102.

The circuitry 202 may be further configured to establish a dedication communication with the selected first teleoperation server 106A of the plurality of teleoperation servers 106A-106B. For the establishment of the dedication communication, the circuitry 202 may initially measure the channel quality or the reception strength of the signals received from the base station associated with the vehicle control system 104 or the vehicle 102. In case the channel quality or the reception strength is above a predefined threshold, the circuitry 202 may establish the dedication communication with the selected first teleoperation server 106A through the base station associated with the vehicle control system 104 to get the teleoperation service.

On the contrary, in case the reception strength of the signals received from the existing base station is lower than the predefined threshold, the circuitry 202 may be configured to predict or search other base stations or network channels located on the road 118 or in the first geo-location 124. In some embodiments, the vehicle control system 104 may be associated or registered with multiple network providers of a particular location. The circuitry 202 may generate pre-map network information which may indicate current reception strengths of the signals received from different registered base stations or network channels available on the road 118 or in the first geo-location 124. The circuitry 202 may further analyze the generated pre-map network information and predict or select the base station or the network channel which provides the best reception strength or channel quality. Thus, the circuitry 202 may initiate the teleoperation operation with the first teleoperation server 106A through the selected base station or the network channel indicating the maximum signal strength. The circuitry 202 may further provide real-time optimization of data packets to be sent through the selected network channel or the base station based on regular monitoring of the strength of the received signal or channel quality. In the optimization, the circuitry 202 may adjust number of data packets sent through the selected network channel based on the real-time monitoring of the received signal strength or based on the real-time generation of the pre-map network information. In some embodiments, the real-time optimization of the data packets communicated during the teleoperation mode may be performed by the selected first teleoperation server 106A.

In the teleoperation mode, the circuitry 202 may be configured to send a teleoperation initiation request to the selected first teleoperation server 106A. The teleoperation initiation request may include the identification information (i.e. registration number of the vehicle 102, vehicle type information (i.e. model details) of the vehicle 102, current geo-location (i.e. state or country), destination point of the current route of the vehicle 102, current time-zone of the vehicle 102). The circuitry 202 may further wait for a predefined time period to receive an acknowledgement from the first teleoperation server 106A. The circuitry 202 may control the braking system 218 or the speed control system 216 either to stop the vehicle 102 or drive the vehicle 102 at a low speed until the acknowledgement is received from the first teleoperation server 106A. The predefined time period may allow sufficient time for successful transition between the current operation mode of the vehicle 102 to the teleoperation mode. The received acknowledgement may include information about one of the first plurality of teleoperation devices 120A-120B and information about the associated teleoperator (i.e. first teleoperator 122A or second teleoperator 122B). For example, the first teleoperation server 106A may select the first teleoperation device 120A and the first teleoperator 122A based on their availability for the time required to complete the current journey associated with the vehicle 102. In some embodiments, the first teleoperation server 106A may select the first teleoperation device 120A and the first teleoperator 122A based on the driving capability to drive the vehicle 102 remotely. The received acknowledgement may include the driving licensing information of the selected first teleoperator 122A. The circuitry 202 may analyze the driving licensing information of the selected first teleoperator 122A to check whether the first teleoperator 122A has a valid driving license to drive the vehicle 102 in the first geo-location 124. The first geo-location of the vehicle 102 and the second geo-location 126 of the first teleoperator 122A may indicate different countries or states.

The circuitry 202 may be further configured to transmit teleoperation acceptance information to the selected first teleoperation server 106A based on the received acknowledgement (including the driving capability and the driving licensing information) of the selected first teleoperator 122A or the first teleoperation device 120A. The first teleoperation server 106A may control or monitor the teleoperation communication between the vehicle control system 104 of the vehicle 102 and the selected first teleoperation device 120A. The circuitry 202 may transmit the captured one or more signals captured by the plurality of sensors 208 to the first teleoperation device 120A through the first teleoperation server 106A. The transmitted one or more signals of the vehicle 102 may be rendered on a display screen (shown in FIG. 4) of the first teleoperation device 120A. The first teleoperator 122A associated or operating the first teleoperation device 120A may visualize the rendered one or more signals of the vehicle 102 and may control different control options of the first teleoperation device 120A to remotely control the movement of the vehicle 102. The details of the teleoperation device (for example the first teleoperation device 120A), the associated control options to remotely control the vehicle 102 is described in detail, for example, in FIG. 4.

In some embodiments, during the teleoperation mode, the circuitry 202 may continuously control the first image capturing device 112A and the second image capturing device 112B to capture the one or more first images and the second images. The circuitry 202 may further measure the current situations outside or inside the vehicle 102 based on the analysis of the one or more first images and the second images as described in FIGS. 1 and 3A. In case, the circuitry 202 determines that the current situation, during the teleoperation mode, can be handled by the vehicle 102 automatically, then the circuitry 202 may be configured to send a teleoperation release request to the selected first teleoperation server 106A or the first teleoperation device 120A. Based on the acknowledgement from the first teleoperation server 106A or the first teleoperation device 120A, the circuitry 202 of the vehicle control system 104 may switch the vehicle 102 from the teleoperation mode to the autonomous mode or the driver mode. For example, in case the circuitry 202 determines that the vehicle 102 has reached to a plane highway from the mountain region 302, then the vehicle 102 may be released from being controlled by the first teleoperator 122A and may switch to the autonomous mode. This continuous monitoring of the current situations during the teleoperation mode, may help the vehicle 102 or the user 116 to save certain cost rather than being driven by the teleoperators for longer distances which may not be desired.

FIG. 3B illustrates a second exemplary scenario to provide driving assistance for a vehicle, in accordance with an embodiment of the disclosure. FIG. 3B is explained in conjunction with elements from FIGS. 1, 2, and 3A. With reference to FIG. 3B, there is shown a second scenario 300B. In the second scenario 300B, there is shown an interior view of the vehicle 102. The vehicle 102 may include the second image capturing device 112B. The second image capturing device 112B may be located on an interior portion the vehicle 102 to obtain a clear and unhindered view of a face 304 of the user 116 driving the vehicle 102 in the driver mode. The position of the second image capturing device 112B in the interior portion of the vehicle 102 shown in FIG. 3A is merely an example. The present disclosure may be also applicable to other positions of the second image capturing device 112B, without a deviation from scope of the disclosure.

The circuitry 202 may be configured to control the second image capturing device 112B to capture the one or more second images indicating the interior view of the vehicle 102. The circuitry 202 may detect a presence of the user 116 on the driver seat based on the analysis of the captured one or more second images. As shown in FIG. 3B, the captured one or more second images may include an image of the face 304 of the user 116 on the driver seat of the vehicle 102. The circuitry 202 may be configured to analyze facial characteristics or expressions of the user 116 from the captured second images based on the detected presence of the user 116 on the driver seat. The analyzed facial characteristics or expressions of the user 116 may be used to determine the emotional state of the user 116 for a predefined time period. The facial characteristics or expressions may indicate one or more motions or positions of muscles of the face 304 of the user 116, where the facial expressions may manifest an emotion. The muscles of the face 304 may move the skin of the user 116, may create facial lines/folds, or may cause the movement of facial features, such as mouth, head, nose, eye, eyebrows of the user 116 based on which the emotional state of the user 116 may be determined for the predefined period of time. Examples of different emotional state may include, but are not limited to, a happy emotion, a sad emotion, an angry emotion, a calm emotion, a fear emotion, an excited emotion, a confused emotion, a stressed emotion, a disgusted emotion, a surprised emotion, an excitement emotion, or a scared emotion.

In FIG. 3B, there is also shown the biometric sensor 112C worn by the user 116 (for example on a wrist). The biometric sensor 112C worn on the wrist of the user 116 as shown is merely an example. The present disclosure may be also applicable to other positions on a body of the user 116 where the biometric sensor 112C may be worn, without a deviation from scope of the disclosure. The circuitry 202 may be configured to control the biometric sensor 112C to continuously monitor biometric data (for example, but are not limited to, pulse rate, breath rate, body temperature, heartbeat sensor, or blood-flow) of the user 116. The circuitry may further determine the emotional state of the user 116 driving the vehicle 102 based on the analysis of the facial characteristics and the monitored biometric data of the user 116.

The circuitry 202 may determine different situations not suitable for driving based on the determined emotional state of the user 116. For example, the circuitry 202 may determine that the user 116 may be angry, confused, nervous, sleepy, unconfident, stressed, or scared while operating the vehicle 102 in the driver mode. Such situations may not be suitable for driving and may lead to accidents. For example, based on the biometric data (for example body temperature, heart-rate, pulse-rate), the circuitry 202 may determine that current medical condition of the user 116 may not be suitable for driving the vehicle 102. Such detected emotional states and the medical condition of the user 116 may be considered as the trigger input to change the current operation mode (i.e. driver mode) to the teleoperation mode in which the vehicle 102 may be controlled remotely by the selected first teleoperation device 120A or the first teleoperator 122A as described in detail, for example, in FIG. 3A.

Figure 4:
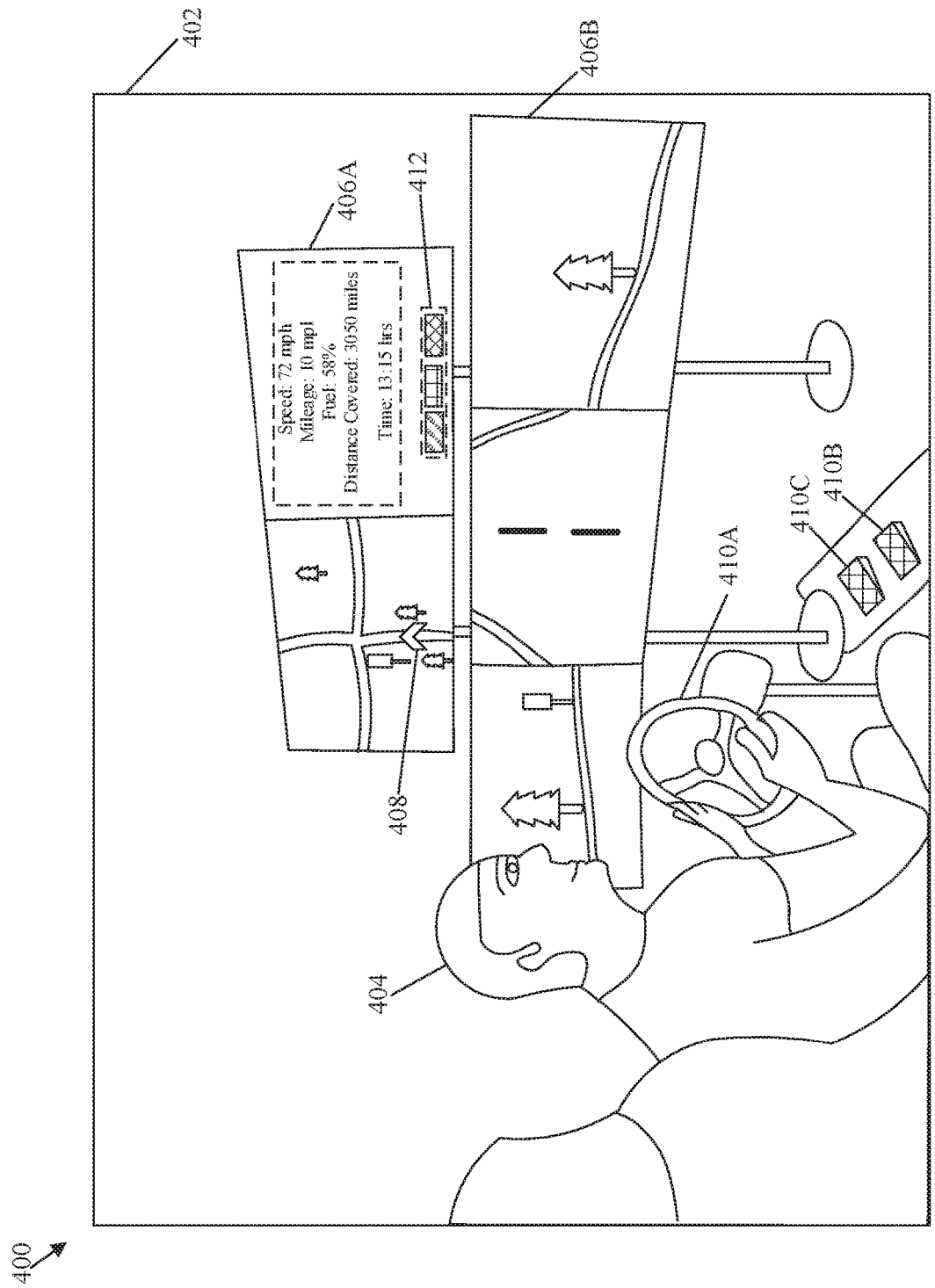
FIG. 4 illustrates an exemplary scenario for teleoperation device to provide driving assistance for a vehicle, in accordance with an embodiment of the disclosure.

FIG. 4 illustrates an exemplary scenario for teleoperation device to provide driving assistance for a vehicle, in accordance with an embodiment of the disclosure. FIG. 4 is explained in conjunction with elements from FIGS. 1, 2, 3A, and 3B. With reference to FIG. 4, there is shown a scenario 400 which depicts a teleoperation device 402. The teleoperation device 402 may be similar to each of the first plurality of teleoperation devices 120A-120B and the second plurality of teleoperation devices 120C-120D of FIG. 1. The teleoperation device 402 may be located at the second geo-location 126 and the vehicle 102 may be located at the first geo-location 124 which may be different from the second geo-location 126. In FIG. 4, there is also shown a teleoperator 404 which may be similar to each of the first plurality of teleoperator 122A-122B and the second plurality of teleoperator 122C-122D. The teleoperator 404 may be associated with the teleoperation device 402. The teleoperator 404 may be operating the teleoperation device 402 to provide the teleoperation service to the vehicle 102 by remotely driving the vehicle 102.

The teleoperation device 402 may be configured to receive a teleoperation request from the associated teleoperation server (for example the first teleoperation server 106A). The teleoperation request may include the identification information of the vehicle 102 to which the teleoperation service or a driving assistance has to be provided. In some embodiments, the teleoperation device 402 may directly receive the teleoperation request from the vehicle control system 104 of the vehicle 102 through the communication network 110. The teleoperation device 402 may directly establish a communication with the vehicle control system 104 to remotely control the vehicle 102.

In the teleoperation mode, the teleoperation device 402 may be configured to receive the one or more signals captured by the plurality of sensors 208 of the vehicle 102. The captured one or more signals may include the one or more first images captured by the first image capturing device 112A, the one or more second images captured by the second image capturing device 112B, and other parameters (for example temperature, geo-location, vibration, fuel level, coolant level, gear position, pressure, or electric voltages) of the vehicle 102. The teleoperation device 402 may further display the received one or more signals on a first display screen 406A and a second display screen 406B of the teleoperation device 402. The two display screens of the teleoperation device 402 shown in FIG. 4 is merely an example. The teleoperation device 402 may include only one display screen or more than two display screens to render the received one or more signals, without a deviation from scope of the disclosure.

As shown in FIG. 4, the first display screen 406A may display the map information received from the navigation server 108. The map information may indicate the route followed by the vehicle 102 with respect to the current journey. The displayed map information may also indicate a location icon 408 of the vehicle 102. The location icon 408 may indicate the current geo-location of the vehicle 102. The teleoperator 404 may remotely control the route of the vehicle 102 based on the display map information received from the navigation server 108. The first display screen 406A may also display different parameters measured by different sensors of the vehicle 102. For example, in FIG. 4, the first display screen 406A may display current speed, current mileage, fuel level, total distance covered, and the current time at current geo-location of the vehicle 102.

The teleoperation device 402 may display the one or more first images included in the one or more signals on the second display screen 406B. The one or more first images may indicate images of the surrounding of the vehicle 102 in the plurality of direction (for example front, right, left, or back). The teleoperator 404 may be able to visualize the surrounding of the vehicle 102 based on the displayed first images. In some embodiments, the one or more second images indicating the interior view of the vehicle 102 may be displayed on the first display screen 406A or the second display screen 406B. The teleoperation device 402 may receive control inputs from the teleoperator 404 to display either of the first images indicating the surrounding or the second images indicating the interior view of the vehicle 102. Thus, the teleoperator 404 may be able to view a real-time status of the vehicle 102 by dynamic visualization of the first images, second images, the map information, and different parameters of the vehicle 102 on the teleoperation device 402.

As shown in FIG. 4, the teleoperation device 402 may further include a first plurality of control elements 410A-410C for the teleoperator 404 to provide control inputs to the teleoperation device 402. The teleoperator 404 may control the first plurality of control elements 410A-410C based on the displayed one or more signals of the vehicle 102. The first plurality of control elements 410A-410C may include a first control element 410A. For example, the first control element 410A may be a steering wheel. The teleoperator 404 may control the first control element 410A to provide the control inputs with respect to the direction (left or right). The teleoperation device 402 may be configured to receive the control inputs with respect to the direction through the first control element 410A as the steering wheel. The teleoperation device 402 may be further configured to transmit a first vehicular instruction to the vehicle control system 104 of the vehicle 102 based on the received control input with respect to the direction. For example, when the teleoperator 404 moves the first control element 410A to a right direction, then the teleoperation device 402 may transmit the first vehicular instruction indicating a command to move the vehicle 102 in the right direction to the same extent at which the first control element 410A has been moved by the teleoperator 404. The circuitry 202 of the vehicle control system 104 may be configured to receive the first vehicular instruction (i.e. direction instruction) and control the steering system 214 to move the vehicle 102 in the right direction based on the received first vehicular instruction.

The first plurality of control elements 410A-410C may include a second control element 410B. For example, the second control element 410B may be an accelerator pedal. The teleoperator 404 may control the second control element 4108 to provide the control inputs with respect to the acceleration or deacceleration. The teleoperation device 402 may be configured to receive the control inputs with respect to the acceleration/deacceleration through the second control element 4108 as the accelerator pedal. The teleoperation device 402 may be further configured to transmit a second vehicular instruction to the vehicle control system 104 of the vehicle 102 based on the received control inputs with respect to the acceleration/deacceleration. For example, when the teleoperator 404 presses the second control element 410B, then the teleoperation device 402 may transmit the second vehicular instruction indicating a command to increase the speed of the vehicle 102 to the same extent at which the second control element 4106 has been pressed by the teleoperator 404. The circuitry 202 of the vehicle control system 104 may be configured to receive the second vehicular instruction and control the speed control system 216 to increase the speed of the vehicle 102 based on the received second vehicular instruction.

The first plurality of control elements 410A-410C may further include a third control element 410C. For example, the third control element 410C may be a brake pedal. The teleoperator 404 may control the third control element 410C to provide the control inputs with respect to the brakes. The teleoperation device 402 may be configured to receive the control inputs with respect to the brakes through the third control element 410C as the brake pedal. The teleoperation device 402 may be further configured to transmit a third vehicular instruction to the vehicle control system 104 of the vehicle 102 based on the received control inputs with respect to the applied brakes. For example, when the teleoperator 404 presses the third control element 410C, then the teleoperation device 402 may transmit the third vehicular instruction indicating a command to decrease the speed or stop the vehicle 102 to the same extent at which the third control element 410C has been pressed by the teleoperator 404. The circuitry 202 of the vehicle control system 104 may be configured to receive the third vehicular instruction and control the speed control system 216 and the braking system 218 to decrease the speed of the vehicle 102 and stop the vehicle 102 based on the received third vehicular instruction.

In accordance with an embodiment, the teleoperation device 402 may control the first display screen 406A to display a second plurality of control elements 412 as shown in FIG. 4. The teleoperation device 402 may be configured to display the second plurality of control elements 412 based on the identification information of the vehicle 102 included in the teleoperation request which was received either from the teleoperation server or the vehicle control system 104 of the vehicle 102. For example, the second plurality of control elements 412 may be touch buttons displayed on the first display screen 406A of the teleoperation device 402. The teleoperation device 402 may be configured to determine the type or model number of the vehicle 102 based on the identification information and dynamically display the second plurality of control elements 412 on the first display screen 406A. The teleoperation device 402 may determine that the vehicle 102 of the specific type or model number may have specific features which may not be operated using the first plurality of control elements 410A-410C. For example, the vehicle 102 may have specific lighting or sound system which may be uncommon or available in the specific type of the vehicle 102. Thus, based on the determination of the specific type of the vehicle 102, the teleoperation device 402 may control the first display screen 406A, to display the second plurality of control elements 412 (for example as the touch button). The teleoperator 404 may control the second plurality of control elements 412 to remotely control the corresponding features (for example specific lighting or sound system) in the vehicle 102.

In some embodiments, the teleoperation device 402 may include more control elements through which the teleoperator 404 may operate the vehicle 102 remotely. The details of the other control elements have been omitted for the sake of brevity. Thus, in the teleoperation mode, the teleoperator 404 (situated at different location than the vehicle 102) may remotely control the vehicle 102 at or after the situations which may be difficult for the vehicle 102 to handle in the autonomous mode or difficult for the driver to drive the vehicle 102 in the driver mode. In some embodiments, in the teleoperation mode, the teleoperator 404 may continuously control the vehicle 102 remotely throughout the journey. In another embodiment, the teleoperator 404 or the teleoperation device 402 may stop controlling the vehicle 102 based on the receipt of the teleoperation release request received from the vehicle control system 104 of the vehicle as described in FIG. 3A.

Figure 5:
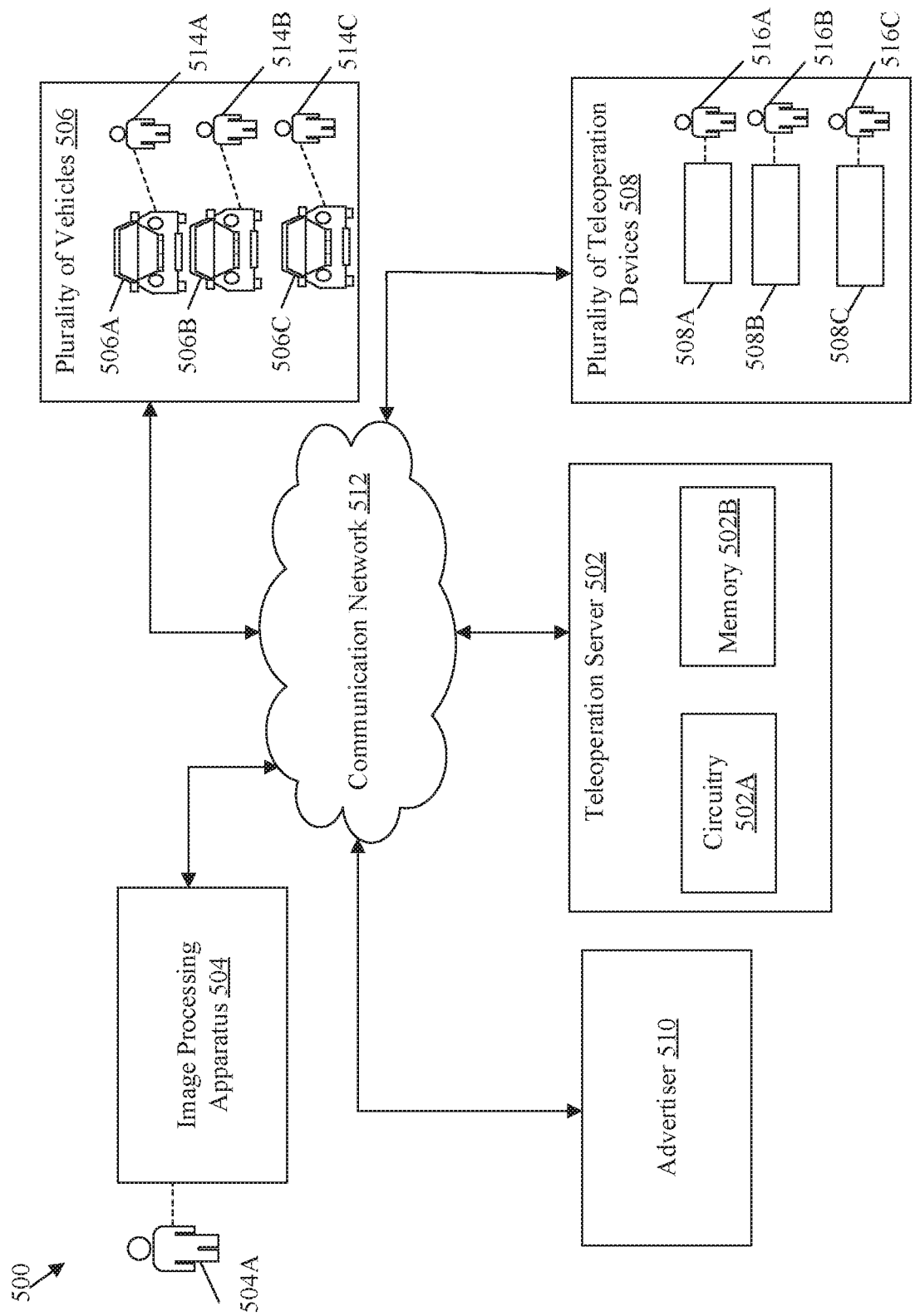
FIG. 5 is a block diagram that illustrates an exemplary second network environment for a teleoperation server to provide driving assistance for a vehicle, in accordance with an embodiment of the disclosure.

FIG. 5 is a block diagram that illustrates an exemplary second network environment for a teleoperation server to provide driving assistance for a vehicle, in accordance with an embodiment of the disclosure. FIG. 5 is explained in conjunction with elements from FIGS. 1, 2, 3A, 3B, and 4. With reference to FIG. 5, there is shown a network environment 500.

In the network environment 500, there is shown a teleoperation server 502, an information processing apparatus 504, a plurality of vehicles 506, a plurality of teleoperation devices 508, and an advertiser 510. There is further shown a communication network 512 through which the teleoperation server 502, the information processing apparatus 504, the plurality of vehicles 506, the plurality of teleoperation devices 508, and the advertiser 510 communicate. The teleoperation server 502 may include circuitry 502A and a memory 502B. The functions of the teleoperation server 502 may be similar to functions of each of the plurality of teleoperation servers 106A-106B.

The information processing apparatus 504 may be associated or owned by a first user 504A. The plurality of vehicles 506 may include a first vehicle 506A, a second vehicle 506B, and a third vehicle 506C. The functions of each of the first vehicle 506A, the second vehicle 506B, and the third vehicle 506C may be similar to the functions of the vehicle 102 shown in FIG. 0.1. The first vehicle 506A, the second vehicle 506B, and the third vehicle 506C may be associated with a first owner 514A, a second owner 5146, and a third owner 514C, respectively. The plurality of teleoperation devices 508 by include a first teleoperation device 508A, a second teleoperation device 508B, and a third teleoperation device 508C. The function of each of the first teleoperation device 508A, the second teleoperation device 508B, and the third teleoperation device 508C may be similar to functions of the first teleoperation device 120A in FIG. 1. The first teleoperation device 508A, the second teleoperation device 508B, and the third teleoperation device 508C may be associated or operated by a first teleoperator 516A, a second teleoperator 516B, and a third teleoperator 516C, respectively. For the sake of brevity, only three vehicles and teleoperation devices have been shown in FIG. 5. However, in some embodiments, there may be more than three vehicles and teleoperation devices communicably coupled with the teleoperation server 502, without limiting the scope of the disclosure.

The circuitry 502A may include suitable logic, circuitry, interfaces, and/or code that may be configured to execute a set of instructions stored in the memory 502B. The circuitry 502A may be configured to receive the teleoperation request from the information processing apparatus 504. The circuitry 502A may be further configured to assign one of the plurality of vehicles 506 and one of the plurality of teleoperation devices 508 to provide a teleoperation service to the first user 504A of the information processing apparatus 504 based on the received teleoperation request. The circuitry 502A may further control a communication between the assigned one of the plurality of vehicles 506 and one of the plurality of teleoperation devices 508. The circuitry 502A may also calculate a first incentive value for the assigned one of the plurality of vehicles 506 and calculate a second incentive value for the assigned one of the plurality of teleoperation devices 508. In some embodiments, the circuitry 502A may receive the teleoperation request from a vehicle control system of one of the plurality of vehicles 506. In such case, the circuitry 502A may select one of the plurality of teleoperation devices 508 to provide the teleoperation service to one of the plurality of vehicles from which the teleoperation request has been received.

The circuitry 502A may be implemented based on a number of processor technologies known in the art. Examples of the circuitry 502A may include a Graphical Processing Unit (GPU), a Central Processing Unit (CPU), an x86-based processor, an x64-based processor, a Reduced Instruction Set Computing (RISC) processor, an Application-Specific Integrated Circuit (ASIC) processor, a Complex Instruction Set Computing (CISC) processor, and/or other hardware processors.

The memory 502B may include suitable logic, circuitry, interfaces, and/or code that may be configured to store a set of instructions executable by the circuitry 502A. The memory 502B may be configured to store vehicle information of the plurality of vehicles 506 and teleoperation information of the plurality of teleoperation devices 508. The vehicle information may include, but is not limited to, the identification information, availability information, the current geo-location, or the registered owner information of the plurality of the vehicles 506. The teleoperation information may include, but is not limited to, the current geo-location, time-zone information, availability information, or the driving licensing information of the plurality of teleoperation devices 508. Examples of implementation of the memory 206 may include, but are not limited to, Random Access Memory (RAM), Read Only Memory (ROM), Hard Disk Drive (HDD), a Solid-State Drive (SSD), a CPU cache, and/or a Secure Digital (SD) card.

The information processing apparatus 504 may include suitable logic, circuitry, interfaces and/or code that may be configured to provide the teleoperation request to the teleoperation server 502. The information processing apparatus 504 may include an application program interface (API) or a graphical user interface (GUI) which may be configured to initiate the teleoperation request. Examples of the information processing apparatus 504 may include, but are not limited to a smartphone, a cellular/mobile phone, a personal digital assistance (PDA), a handheld computer, an audio-video (AV) entertainment device, a virtual-reality (VR) device, a computing device, a gaming device, and/or a consumer electronic (CE) device with wired/wireless communication capability.

In some embodiments, the teleoperation request initiated by the first user 504A may a request for a vehicle to start a journey between a start point (for example current location of the information processing apparatus 504) and a destination point. The teleoperation request as a request to travel between the start point and the destination point in FIG. 5 is merely an example. The present disclose may also include other examples, like package delivery, remote valet parking, or renting the vehicle, without deviating from the scope of the present disclosure.

In operations, the information processing apparatus 504 may receive a request from the first user 504A for a journey between the start point to the destination using a vehicle. The request may be received through an application installed on the information processing apparatus 504. The installed application may be a cab or a taxi service application. The start point may be the current location of the information processing apparatus 504. The first user 504A and the information processing apparatus 504 may be associated with a first geo-location (i.e. particular country). The information processing apparatus 504 may be further configured to transmit the teleoperation request to the teleoperation server 502. The teleoperation request received by the teleoperation server 502 may include, route information indicating the start point and the destination point.

The circuitry 502A of the teleoperation server 502 may extract the vehicle information and the teleoperation information from the memory 502B in response to the receipt of the received teleoperation request. The vehicle information may include the identification information for each of the plurality of vehicles 506. The identification information may also include registered owner information about owners (i.e. first owner 514A, second owner 514B, and third owner 514C) of the plurality of vehicles 506. The registered owner information may indicate contact information of the first owner 514A, second owner 514B, and third owner 514C who are registered with the teleoperation server 502 to provide their vehicles for the teleoperation service. The identification information may also include the availability information of each of the plurality of vehicles 506. The availability information may indicate whether the corresponding one of the plurality of vehicles 506 may be available for the first user 504A to travel from the start point to the destination point included in the teleoperation request. The vehicle information of the plurality of vehicles 506 may also include the current geo-location of each the plurality of vehicles 506. In some embodiments, the circuitry 502A may be configured to receive the current geo-locations of the plurality of vehicles 506 at regular time intervals. Based on the current geo-locations of the plurality of vehicles 506, the circuitry 502A may determine which one the plurality of vehicles 506 is closest to the start point of the journey mentioned in the received teleoperation request.

The circuitry 502A may be further configured to analyze the teleoperation request (i.e. including the start point and the destination point) received from the information processing apparatus 504 and the extracted vehicle information (i.e. including the identification information, the availability information, and the current geo-locations) of the plurality of vehicles 506. The circuitry 502A may be further configured to select one of the plurality of vehicles 506 based on the analysis of the received teleoperation request and the extracted vehicle information. For example, the circuitry 502A may select the first vehicle 506A from the plurality of vehicles 506 to carry the first user 504A between the start point to the destination point. The circuitry 502A may send a confirmation request to the owner of the selected first vehicle 506A. For example, the circuitry 502A may send the confirmation request to a vehicle control system of the first vehicle 506A or an information processing apparatus of the first owner 514A, via the communication network 512. In response to the transmission of the confirmation request, the circuitry 502A may be configured to receive an acknowledgement from the vehicle control system of the first vehicle 506A or the information processing apparatus of the first owner 514A, via the communication network 512. In case, the received acknowledgement is positive, the circuitry 502A may finally select the first vehicle 506A and calculate the first incentive value (for example a rental fee) for the first owner 514A of the first vehicle 506A. The first incentive value may be based on a distance between the start point and the destination point of the journey. For example, higher the distance between the start point and the destination point, higher may be the first incentive value for the first owner 514A of the first vehicle 506A. The first incentive value may also be based on the time associated with the journey. For example, the circuitry 502A may calculate a higher first incentive value during the night time of the journey as compared to the day time. In some embodiments, the circuitry 502A may be configured to calculate a higher first incentive value based on location of the start point and the destination point. For example, in case the destination point of the journey is close to a location of the first owner 514A (i.e. location where the first vehicle 506A has to return after the completion of the journey), then the first incentive value may increase because the cost of return between the destination point and the location of the first owner 514A may be lesser. In case, the received acknowledgement is negative, the circuitry 502A may search for other registered vehicles of the plurality of vehicles 506.

The circuitry 502A of the teleoperation server 502 may be further configured to select one of the plurality of teleoperation devices 508 to provide the teleoperation service to the selected first vehicle 506A. The current geo-location of the information processing apparatus 504 of the first user 504A and the current geo-location of the plurality of teleoperation devices 508 may be different. For example, the current country of the information processing apparatus 504 and the country of the plurality of teleoperation devices 508 may be different. The plurality of teleoperation devices 508 may be situated in a country where the cost of driving may be lesser than the country in which information processing apparatus 504 or the first user 504A may be currently situated. The cost for the first user 504A to travel between the start point and the destination point, using one of the plurality of teleoperation devices 508, may be lesser in comparison to utilizing a driver who is situated in the same country as of the first user 504A.

The circuitry 502A may be configured to extract the teleoperation information from the memory 502B to select one of the plurality of teleoperation devices 508. The teleoperation information may indicate the current location, the time-zone information, the availability information, and the driving licensing information of the plurality of teleoperation devices 508. For example, the circuitry 502A may select the first teleoperation device 508A from the plurality of teleoperation devices 508 considering that the cost of driving the vehicle at the current location of the first teleoperation device 508A may be cheaper than the cost of driving at the current location of the first user 504A or the start/destination points. In some embodiments, the circuitry 502A may select the first teleoperation device 508A based on the time-zone information of the selected first teleoperation device 508A and the time-zone information of the first user 504A such the current time-zone of the selected first teleoperation device 508A and the first user 504A are substantially same (for example day time). With same time-zones, the teleoperation server 502 ensures that the selected the first teleoperation device 508A may be available to provide the teleoperation services to the selected first vehicle 506A. For example, in case, the first user 504A has to travel during the day time, then the teleoperation server 502 may select one of plurality of the teleoperation devices 508 which may be working or available to drive the first vehicle 506A during the day time. In case, the time-zone information of one of the plurality of teleoperation device 508 indicates the night time at which the teleoperation service may not be available, then that teleoperation device may not be selected.

In some embodiments, the circuitry 502A may select the first teleoperation device 508A based on the stored driving licensing information of the first teleoperator 516A associated with the first teleoperation device 508A, such that the first teleoperator 516A having a valid driving license of the locations of the first user 504A and the destination point may be selected as described, for example, in FIG. 3B.

The circuitry 502A of the teleoperation server 502 may configured to analyze the teleoperation request (including the start point and the destination point) and the teleoperation information (including the current geo-locations, time-zone information, availability information and the driving licensing information) of the plurality of teleoperation devices 508. The circuitry 502A may be further configured to select the first teleoperation device 508A from the plurality of teleoperation devices 508 based on the analysis between the received teleoperation request and the stored teleoperation information such that a low cost and available teleoperation device or the teleoperator may be selected with valid driving license to drive the selected first vehicle 506A as also described in detail, for example, in FIG. 3A. In some embodiments, the teleoperation request may be directly received from the vehicle control system of the first vehicle 506A which needs to travel between the start point and the destination point using the teleoperation service provided by one of the plurality of teleoperation devices 508 selected by the teleoperation server 502.

In some embodiments, the vehicle information may include specification information of the plurality of vehicles 506. The specification information may include details of the plurality of vehicles 506. The details may include, but are not limited to, model number, details of components/part, or operating features of the plurality of vehicles 506. The teleoperation information may include the driving capability information about the plurality of teleoperation devices 508 and the associated teleoperators. The driving capability information may indicate which particular vehicles (and operating features of the vehicles) can be operated by the plurality of teleoperation devices 508 and the associated teleoperators in the teleoperation service. The circuitry 502A of the teleoperation server 502 may be configured to select one of the teleoperation devices 508 and the associated teleoperators based on the comparison of the specification information of the selected first vehicle 506A and the driving capability information. For example, in case, the specification information indicates that the first vehicle 506A is of a particular model, and the driving capability information indicates that the first teleoperation device 120A/first teleoperator 516A have the capability or driving experience n of the particular model, then then circuitry 502A may select the first teleoperation device 120A/first teleoperator 516A to drive the first vehicle 506A. In another example, in case the specification information indicates that the selected first vehicle 506A may be a specific operating feature (like anti-brake system) and the driving capability information of the first teleoperation device 120A/first teleoperator 516A does not capability or experience about the specific operating feature, then the circuitry 502A may not select the first teleoperation device 120A/first teleoperator 516A to provide the teleoperation service to the selected first vehicle 506A. In some embodiments, the circuitry 502A may select both the plurality of vehicles 506 and the plurality of teleoperation devices 508 based on the specification information and the driving capability information In accordance of an embodiment, based on the selection of the first vehicle 506A and the first teleoperation device 508A, the circuitry 502A may be configured to control a dedication communication channel between the vehicle control system of the selected first vehicle 506A and the selected first teleoperation device 508A. The circuitry 502A may predict or search the nearby base stations or available network channels based on the generated pre-map network information to establish the dedication communication channel as described, for example, in FIG. 3A. The selected first teleoperation device 508A may further utilize the establish dedication communication channel to remotely control the movement of the selected first vehicle 506A as described in detail, for example, in FIG. 4. The selected first teleoperation device 508A may receive the one or more signals captured by the plurality of sensors 208 of the first vehicle 506A and may further transmit the vehicular instructions to the first vehicle 506A through the established communication channel of the communication network 512. In some embodiments, the first teleoperation device 508A may receive the one or more signals from the first vehicle 506A and may further transmit the vehicular instructions to the first vehicle 506A through the teleoperation server 502.

The circuitry 502A of the teleoperation server 502 may be further configured to wait for a response indicating a completion of the journey from the information processing apparatus 504 or the first teleoperation device 508A. Once the response is received, the circuitry 502A of the teleoperation server 502 may control a termination of the dedicated communication between the first vehicle 506A and the first teleoperation device 508A. The circuitry 502A may be further calculate the second incentive value (i.e. driving fee) for the first teleoperator 516A or the first teleoperation device 508A. The circuitry 502A may calculate the second incentive value based on distance travelled or time taken between the start time and the destination point of the journey. For example, higher the distance or time taken, higher may be the second incentive value for the first teleoperator 516A. In some embodiments, the circuitry 502A may calculate the second incentive value based on the current driving cost at the current geo-location of the first teleoperation device 508A or the first teleoperator 516A. In some embodiments, the circuitry 502A may calculate the second incentive value based on the time at which the teleoperation service has been provided by the first teleoperator 516A. For example, during night time, the second incentive value or the driving fee may be higher than the day time. In accordance of an embodiment, the circuitry 502A may transfer the calculated second incentive value in a bank account of the first teleoperator 516. In some embodiments, the circuitry 502A may transmit the calculated second incentive value to the first teleoperation device 508A associated with the first teleoperator 516A. The first teleoperation device 508A may display the received second incentive value to the first teleoperator 516.

With the selection of the teleoperation device or the teleoperator from the different geo-location (i.e. country) where the cost of driving is lesser, the teleoperation server 502 may provide a discount on the travel cost to the first user 504A which may further motivate other users to avail the teleoperation service. The teleoperation server 502 may not only provide discounted travel cost to the first user 504A but may share the profits margins with the owners of the vehicles (for example autonomous vehicle) and the teleoperators. In some embodiments, the teleoperation server 502 may also earn advertising fee from the advertiser 510. The advertiser 510 may be an organization which may advertise their goods or services through the teleoperation service managed by the teleoperation server 502. In such case, the advertiser 510 may provide advertisement content to the teleoperation server 502 which can be rendered on either of the information processing apparatus 504, the plurality of vehicles 506, or the plurality of teleoperation devices 508. The teleoperation server 502 may charge an advertisement fee from the advertiser 510 based on the advertisement content to increase the overall profit margins.

Figure 6:
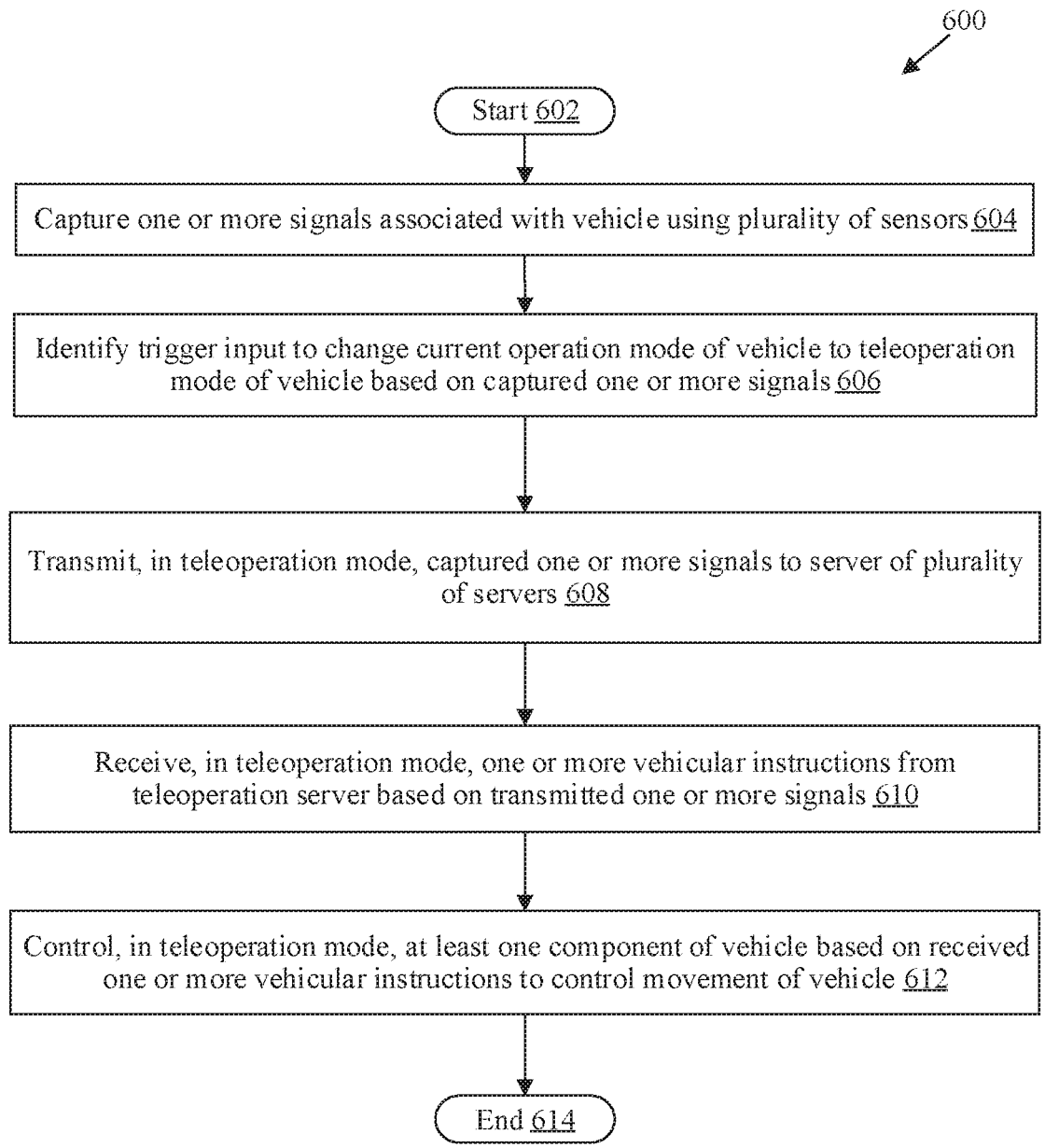
FIG. 6 depicts a first flow chart that illustrates exemplary operations for a vehicle control system to provide driving assistance for a vehicle, in accordance with an embodiment of the disclosure.

FIG. 6 depicts a first flow chart that illustrates exemplary operations for a vehicle control system to provide driving assistance for a vehicle, in accordance with an embodiment of the disclosure. With reference to FIG. 6, there is shown a flowchart 600. The flowchart 600 is described in conjunction with FIGS. 1, 2, 3A, 3B, 4, and 5. The operations from 602 to 612 may be implemented in the vehicle control system 104. The operations of the flowchart 600 may start at 602 and proceed to 604.

At 604, one or more signals associated with the vehicle 102 may be captured using the plurality of sensors 208 of the vehicle 102. The circuitry 202 of the vehicle control system 104 may be configured to control the plurality of sensors 208 to capture the one or more signals. The plurality of sensors and the captured one or more signals are described in detail, for example, in FIGS. 1, 2, 3A, and 3B.

At 606, a trigger input may be identified to change the current operation mode of the vehicle 102 to a teleoperation mode of the vehicle 102 based on the captured one or more signals. The circuitry 202 may be configured to identify the trigger input to change the current operation mode (i.e. autonomous mode or driver mode) of the vehicle 102 to the teleoperation mode of the vehicle 102 as described in detail, for example, in FIGS. 3A and 3B.

At 608, in the teleoperation mode, the captured one or more signals may be transmitted to a teleoperation server of the plurality of teleoperation servers 106A-106B. The circuitry 202 may be configured to transmit the captured one or more signals to the teleoperation server. The selection of the teleoperation server from the plurality of teleoperation server 106-106B may be described in detail, for example, in FIG. 3A. The selection teleoperation server may further transmit the received one or more signals to a teleoperation device.

At 610, in the teleoperation mode, one or more vehicular instructions may be received from the teleoperation server based on the transmitted one or more signals. The circuitry 202 may be configured to receive, in the teleoperation mode, the one or more vehicular instructions from the teleoperation server based on the transmitted one or more signals. The one or more vehicular instructions may be received from the teleoperation device, through the teleoperation server as described in detail, for example, in FIG. 4.

At 612, in the teleoperation mode, at least one component of the vehicle 102 may be controlled based on the received one or more vehicular instructions to control movement of the vehicle 102. The circuitry 202 of the vehicle control system 104 may control the at least one component of the vehicle 102 based on the received one or more vehicular instructions to control movement of the vehicle 102. Example of the components of the vehicle 102 may include, but are not limited to, a steering system, a braking system, an acceleration system, a gear system, a fuel injection system, an ignition system, a lighting system, an infotainment system, a HVAC system, a power system, a navigation system, or a vehicle sensing system. The control of the components of the vehicle 102 is described in detail, for example, in FIGS. 2 and 4. Control passes to end 614.

Figure 7:
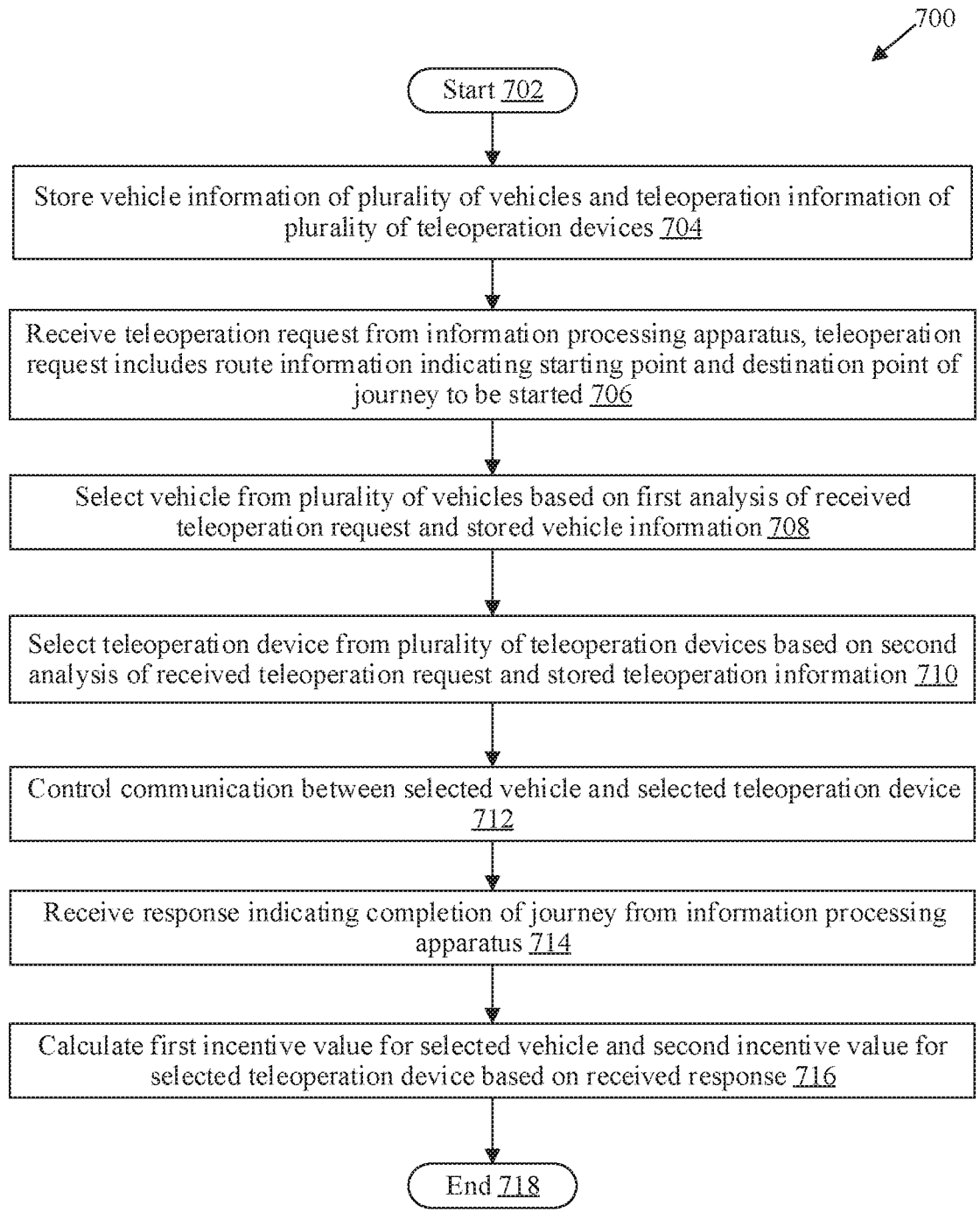
FIG. 7 depicts a second flow chart that illustrates exemplary operations for a teleoperation server to provide driving assistance for a vehicle, in accordance with an embodiment of the disclosure.

FIG. 7 depicts a second flow chart that illustrates exemplary operations for a teleoperation server to provide driving assistance for a vehicle, in accordance with an embodiment of the disclosure. With reference to FIG. 7, there is shown a flowchart 700. The flowchart 700 is described in conjunction with FIGS. 1, 2, 3A, 3B, 4, and 5. The operations from 702 to 716 may be implemented in the teleoperation server 502 or in each of the plurality of teleoperation servers 106A-106B. The operations of the flowchart 700 may start at 702 and proceed to 704.

At 704, the vehicle information of the plurality of vehicles 506 and the teleoperation information of the plurality of teleoperation devices 508 may be stored. The circuitry 502A of the teleoperation server 502 may be configured to store the vehicle information and the teleoperation information in the memory 502B of the teleoperation server 502.

At 706, a teleoperation request may be received from the information processing apparatus 504, wherein the teleoperation request may include the route information indicating the starting point and the destination point of the journey to be started. The teleoperation request may be initiated at the information processing apparatus 504 by the first user 504A. The circuitry 502A may be configured to receive the teleoperation request as described in detail, for example, in FIG. 5.

At 708, a vehicle may be selected from the plurality of vehicles 506 based on a first analysis of the received teleoperation request and the stored vehicle information. The circuitry 502A may be configured to select the vehicle (for example the first vehicle 506A) from the plurality of vehicles 506. The selection of the first vehicle 506A from the plurality of vehicles 506 is described in detail, for example, in FIG. 5.

At 710, a teleoperation device may be selected from the plurality of teleoperation devices 508 based on a second analysis of the received teleoperation request and the stored teleoperation information. The circuitry 502A may be configured to select the teleoperation device (for example the first teleoperation device 508A) from the plurality of teleoperation devices 508. The selection of the first teleoperation device 508A from the plurality of teleoperation devices 508 is described in detail, for example, in FIG. 5.

At 712, a communication between the selected vehicle and the selected teleoperation device may be controlled. The circuitry 502A may be configured to control the communication between the selected vehicle (for example the first vehicle 506A) and the selected teleoperation device (for example the first teleoperation device 508A).

At 714, a response indicating a completion of the journey may be received from the information processing apparatus 504. The circuitry 502A may be configured to receive the response from the information processing apparatus 504. In some embodiments, the response indicting the completion of the journey may be received from the vehicle control system of the selected vehicle (for example the first vehicle 506A) or the selected teleoperation device (for example the first teleoperation device 508A).

At 716, the first incentive value for the selected vehicle and the second incentive value for the selected teleoperation device may be calculated based on the received response. The circuitry 502A may be configured to calculate the first incentive value for the selected vehicle (for example the first vehicle 506A) and the second incentive value for the selected teleoperation device (for example the first teleoperation device 508A) or the selected teleoperator (for example the first teleoperator 516A). The calculation of the first incentive value (i.e. rental fee) and the second incentive value (i.e. driving fee) is described in detail, for example, in FIG. 5. Control passes to end 718.

Figure 8:
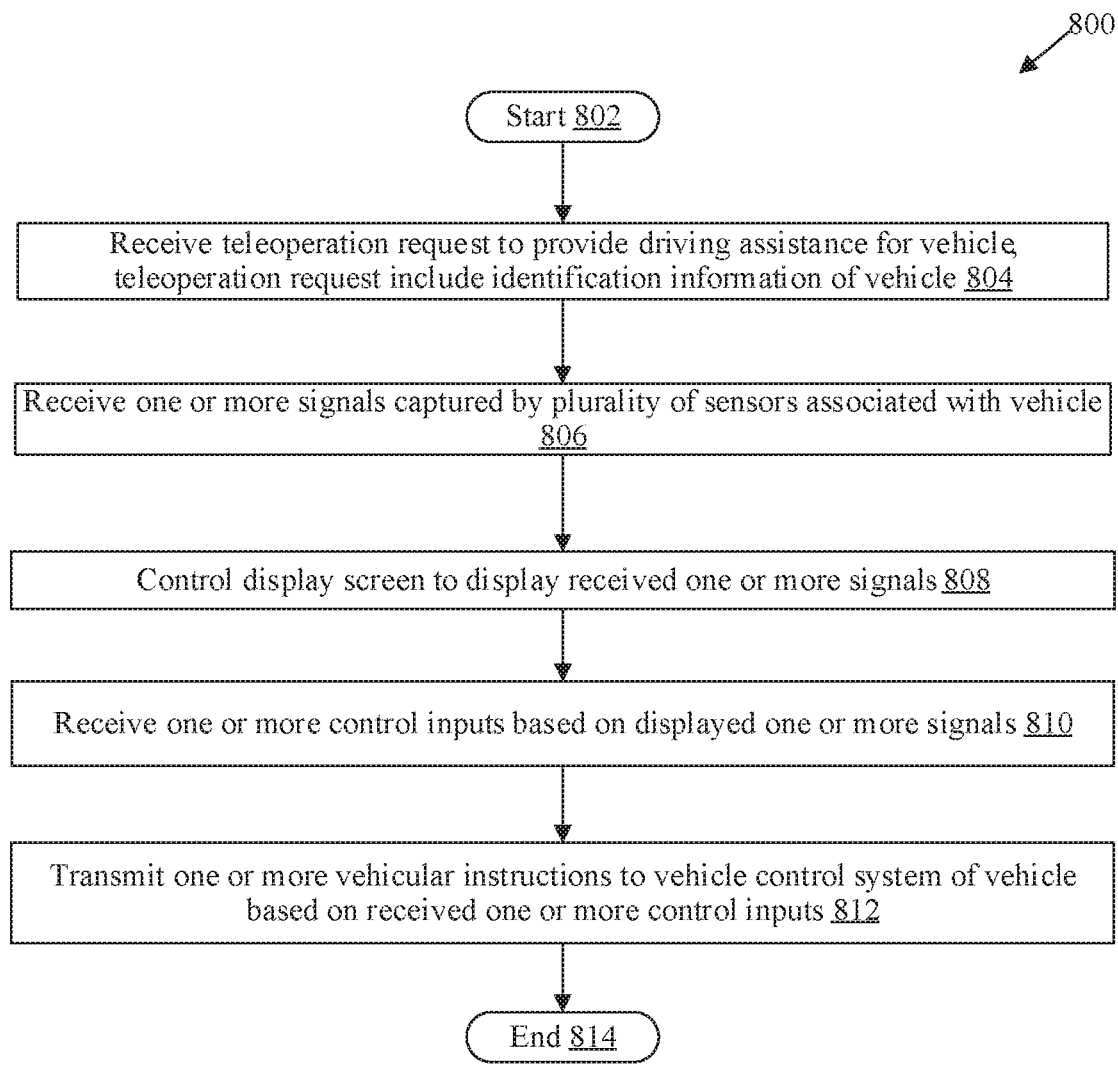
FIG. 8 depicts a third flow chart that illustrates exemplary operations for a teleoperation device to provide driving assistance for a vehicle, in accordance with an embodiment of the disclosure.

FIG. 8 depicts a third flow chart that illustrates exemplary operations for a teleoperation device to provide driving assistance for a vehicle, in accordance with an embodiment of the disclosure. With reference to FIG. 8, there is shown a flowchart 800. The flowchart 800 is described in conjunction with FIGS. 1, 2, 3A, 3B, 4, and 5. The operations from 802 to 812 may be implemented in the teleoperation device 402 or in each of the plurality of teleoperation devices 508, the first plurality of teleoperation devices 120A-120B, or the second plurality of teleoperation devices 120C-120D. The operations of the flowchart 800 may start at 802 and proceed to 804.

At step 804, a teleoperation request may be received to provide a driving assistance for a vehicle, wherein the teleoperation request may include identification information of the vehicle (for example the vehicle 102). In accordance with an embodiment, circuitry (not shown) of the teleoperation device 402 may receive the teleoperation request from the teleoperation server 502. In some embodiments, the teleoperation request may be received from the vehicle control system 104 of the vehicle 102 or from the information processing apparatus 504. The teleoperation request is described in detail, for example, in FIGS. 4 and 5.

At step 806, one or more signals captured by the plurality of sensors 208 associated with the vehicle 102 may be received. The circuitry of the teleoperation device 402 may be configured to receive the one or more signals captured by the plurality of sensors 208 of the vehicle 102 as described in detail, for example, in FIG. 4.

At 808, the display screen may be controlled to display the received one or more signals. The circuitry of the teleoperation device 402 may be configured to control the either of the first display screen 406A or the second display screen 406B to display the one or more captured signals received from the vehicle control system 104 of the vehicle 102 as described in detail, for example, in FIG. 4.

At 810, one or more control inputs may be received based on the displayed one or more signals. The circuitry of the teleoperation device 402 may be configured to receive the one or control inputs from the user 116 through either of the first plurality of control elements 410A-410C or the second plurality of control elements 412 of the teleoperation device 402 as described in detail, for example, in FIG. 4.

At 812, one or more vehicular instructions may be transmitted to the vehicle control system 104 of the vehicle 102 based on the received one or more control inputs. The circuitry of the teleoperation device 402 may be configured to generate and transmit the one or more vehicular instructions to the vehicle control system 104 of the vehicle 102. The one or more vehicular instructions transmitted by the teleoperation device 402 are described in detail, for example, in FIG. 4. Control passes to end 814.

Various embodiments of the disclosure may provide a non-transitory, computer-readable medium and/or storage medium, and/or a non-transitory machine readable medium and/or storage medium stored thereon, a set of instructions executable by a machine and/or a computer to provide driving assistance for a vehicle. The set of instructions may be executable by the machine and/or the computer to perform the steps that may include capture one or more signals associated with the vehicle using a plurality of sensors. The steps may further include identification of a trigger input to change a current operation mode of the vehicle to a teleoperation mode of the vehicle based on the captured one or more signals. The steps may further include, in the teleoperation mode, transmission of the captured one or more signals to a teleoperation server of a plurality of teleoperation servers. The steps may further include, in the teleoperation mode, reception of one or more vehicular instructions from the teleoperation server based on the transmitted one or more signals. The steps may further include, in the teleoperation mode, control of at least one component of the vehicle based on the received one or more vehicular instructions to control movement of the vehicle.

Various embodiments of the disclosure may provide a non-transitory, computer-readable medium and/or storage medium, and/or a non-transitory machine readable medium and/or storage medium stored thereon, a set of instructions executable by a machine and/or a computer to provide teleoperation service. The set of instructions may be executable by the machine and/or the computer to perform the steps that may include storage of vehicle information of a plurality of vehicles and teleoperation information of a plurality of teleoperation devices in a memory. The steps may further include reception of a teleoperation request from an information processing apparatus, wherein the teleoperation request may include route information indicating a starting point and a destination point of a journey to be started. The steps may further include selection of a vehicle from the plurality of vehicles based on a first analysis of the received teleoperation request and the stored vehicle information. The steps may further include selection of a teleoperation device from the plurality of teleoperation devices based on a second analysis of the received teleoperation request and the stored teleoperation information. The steps may further include control of a communication between the selected vehicle and the selected teleoperation device. The steps may further include reception of a response indicating a completion of the journey from the information processing apparatus. The steps may further include calculation of a first incentive value for the selected vehicle and a second incentive value for the selected teleoperation device based on the received response.

Various embodiments of the disclosure may provide a non-transitory, computer-readable medium and/or storage medium, and/or a non-transitory machine readable medium and/or storage medium stored thereon, a set of instructions executable by a machine and/or a computer to provide teleoperation service. The set of instructions may be executable by the machine and/or the computer to perform the steps that may include reception of a teleoperation request to provide a driving assistance for a vehicle, wherein the teleoperation request may include identification information of the vehicle. The steps may further include reception of one or more signals captured by a plurality of sensors associated with the vehicle. The steps may further include control of the display screen to display the received one or more signals and reception of one or more control inputs based on the displayed one or more signals. The steps may further include transmission of one or more vehicular instructions to a vehicle control system of the vehicle based on the received one or more control inputs.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A vehicle control system to provide driving assistance for a vehicle, comprising:
    a plurality of sensors configured to capture one or more signals associated with the vehicle; and
    circuitry, coupled with the plurality of sensors, configured to:
        acquire, from the plurality of sensors, one or more first images indicating an interior view of the vehicle, and biometric data of a rider of the vehicle;
        determine an emotional state of the rider based on an analysis of the one or more first images and the biometric data;
        identify a trigger input to switch from a driver operation mode of the vehicle to a teleoperation mode of the vehicle based on the determined emotional state of the rider;
        transmit a teleoperation request to each teleoperation server of a plurality of teleoperation servers based on the identified trigger input;
        receive teleoperation cost values from the plurality of teleoperation servers based on the transmitted teleoperation request, wherein
            each teleoperation server of the plurality of teleoperation servers is associated with a plurality of teleoperation devices,
            each teleoperation device of the plurality of teleoperation devices is associated with a teleoperator of a plurality of teleoperators, and
            each teleoperation cost value of the teleoperation cost values is a cost of driving the vehicle in the teleoperation mode by a teleoperation device of the plurality of teleoperation devices;
        select a teleoperation server from the plurality of teleoperation servers based on a comparison of the teleoperation cost values received from the plurality of teleoperation servers;

switch from the driver operation mode of the vehicle to the teleoperation mode of the vehicle based on the determined emotional state of the rider and the selection of the teleoperation server;

transmit, in the teleoperation mode, the captured one or more signals to the teleoperation device associated with the selected teleoperation server;

receive, in the teleoperation mode, one or more vehicular instructions from the teleoperation device associated with the selected teleoperation server, wherein the one or more vehicular instructions are received based on the transmitted one or more signals; and control, in the teleoperation mode, at least one component of the vehicle based on the received one or more vehicular instructions to control movement of the vehicle.

2. The vehicle control system according to claim 1, wherein the plurality of sensors comprises a first image capturing device configured to capture one or more second images indicating a view of surrounding of the vehicle in a plurality of directions, and wherein the circuitry is further configured to:
analyze a driving situation indicated by the captured one or more second images; and
identify the trigger input based on the analyzed driving situation to change the driver operation mode to the teleoperation mode of the vehicle.

3. The vehicle control system according to claim 1, wherein the circuitry is further configured to:
determine absence of map information associated with a journey of the vehicle at a time of the journey; and
identify the trigger input based on the determined absence of the map information to change the driver operation mode to the teleoperation mode of the vehicle.

4. The vehicle control system according to claim 1, wherein
each of the plurality of teleoperation servers is associated with a geo-location, and
a teleoperation cost value received from the selected teleoperation server is lowest among the teleoperation cost values received from the plurality of teleoperation servers.

5. The vehicle control system according to claim 1, wherein a geo-location of the vehicle is different from a geo-location of the selected teleoperation server.

6. The vehicle control system according to claim 1, wherein, in the teleoperation mode, the circuitry is further configured to:
retrieve first time-zone information of a geo-location of each of the plurality of teleoperation servers; and
select the teleoperation server from the plurality of teleoperation servers based on the retrieved first time-zone information of each of the plurality of teleoperation servers and second time-zone information of a current geo-location of the vehicle.

7. The vehicle control system according to claim 1, wherein, in the teleoperation mode, the circuitry is further configured to:
receive driving licensing information from each of the plurality of teleoperation servers;
determine that the driving licensing information is compliant with each of a current geo-location of the vehicle and a geo-location of a destination point of a journey of the vehicle; and
select the teleoperation server based on the determination that the driving licensing information is compliant with each of the current geo-location of the vehicle and the geo-location of the destination point of the journey of the vehicle.

8. The vehicle control system according to claim 1, wherein the circuitry is further configured to receive the one or more vehicular instructions from the teleoperation device based on the one or more signals rendered on the teleoperation device.

9. The vehicle control system according to claim 1, wherein the circuitry is further configured to:
determine at least one of a channel quality or a reception strength of signals associated with the one or more vehicular instructions from a first base station associated with the vehicle control system;
continue, in the teleoperation mode, control of the at least one component of the vehicle in a case the at least one of the channel quality or the reception strength of the signals is higher than a determined threshold; and
determine a second base station in a case where at least one of the channel quality or the reception strength of signals is lower than the determined threshold, wherein the first base station and the second base station are at a same geo-location.

10. The vehicle control system according to claim 1, wherein the circuitry is further configured to:
analyze, in the teleoperation mode, a driving situation indicated by the captured one or more signals associated with the vehicle;
transmit, in the teleoperation mode, a release request to the teleoperation device associated with the selected teleoperation server, wherein the transmission of the release request is based on the analyzed driving situation;
receive, in the teleoperation mode, an acknowledgement from the teleoperation device, associated with the selected teleoperation server, based on the transmitted release request; and
switch from the teleoperation mode to one of an autonomous mode or the driver operation mode of the vehicle based on the received acknowledgement.

11. The vehicle control system according to claim 1, wherein
the plurality of sensors comprises a second image capturing device configured to capture the one or more first images, and
wherein the circuitry is further configured to:
detect a presence of the rider at a driver seat of the vehicle based on the analysis of the one or more first images; and
determine the emotional state of the rider over a time period based on the detected presence of the rider.

12. The vehicle control system according to claim 11, wherein
the plurality of sensors comprises a biometric sensor, and
wherein the circuitry is further configured to control the biometric sensor to determine the emotional state of the rider over the time period.

13. The vehicle control system according to claim 11, wherein the circuitry is further configured to:
retrieve past driving information associated with the rider based on the detected presence of the rider; and
identify the trigger input based on the retrieved past driving information to change the driver operation mode to the teleoperation mode of the vehicle.

14. A teleoperation server to provide teleoperation service, comprising:

a memory configured to store vehicle information of a plurality of vehicles and teleoperation information of a plurality of teleoperation devices; and circuitry, coupled with the memory, configured to:
receive a teleoperation request from an information processing apparatus, wherein
the reception of the teleoperation request is based on a trigger to switch from a driver operation mode of a vehicle of the plurality of vehicles to a teleoperation mode of the vehicle,
the vehicle is associated with the information processing apparatus, and
the trigger to switch from the driver operation mode of the vehicle to the teleoperation mode of the vehicle is based on an emotional state of a rider of the vehicle;
the teleoperation request includes route information indicating a starting point and a destination point of a journey to be started;
select the vehicle from the plurality of vehicles based on a first analysis of the received teleoperation request and the stored vehicle information;
select a teleoperation device from the plurality of teleoperation devices based on a second analysis of the received teleoperation request, a comparison of teleoperation cost values associated with the plurality of teleoperation devices, and the stored teleoperation information, wherein
the teleoperation cost values are associated with a plurality of teleoperation servers including the teleoperation server,
each teleoperation server of the plurality of teleoperation servers is associated with a respective plurality of teleoperation devices,
each teleoperation device of the respective plurality of teleoperation devices is associated with a teleoperator of a plurality of teleoperators,
each teleoperation cost value of the teleoperation cost values is a cost of driving the vehicle in the teleoperation mode by the teleoperation device;
control a communication between the selected vehicle and the selected teleoperation device, wherein the driver operation mode of the selected vehicle is switched to the teleoperation mode based on the emotional state of the rider and the selected teleoperation device;
receive a response indicating a completion of the journey from the information processing apparatus; and
calculate a first incentive value for the selected vehicle and a second incentive value for the selected teleoperation device based on the received response.

15. The teleoperation server according to claim 14, wherein the vehicle information comprises at least one of identification information, availability information, a current geo-location, or registered owner information of the plurality of the vehicles.

16. The teleoperation server according to claim 14, wherein the circuitry is further configured to select the teleoperation device from the plurality of teleoperation devices based on the route information in the received teleoperation request and a geo-location of each of the plurality of teleoperation devices.

17. The teleoperation server according to claim 14, wherein the circuitry is further configured to calculate the first incentive value and the second incentive value based on at least one of time information of the journey or geo-locations of the selected vehicle and the selected teleoperation device.

18. The teleoperation server according to claim 14, wherein the teleoperation information comprises at least one of a current geo-location, time-zone information, availability information, or driving licensing information of the plurality of teleoperation devices.

19. The teleoperation server according to claim 14, wherein
the vehicle information indicates specification information of the plurality of vehicles,
the teleoperation information indicates driving capability information of a plurality of human teleoperators associated with each of the plurality of teleoperation devices, and
the circuitry is further configured to select the teleoperation device from the plurality of teleoperation devices based on a comparison between the specification information and the driving capability information.

20. A teleoperation device, comprising:
a display screen; and
circuitry, coupled to the display screen, configured to:
receive a teleoperation request to provide a driving assistance for a vehicle, wherein
the reception of the teleoperation request is based on a trigger to switch from a driver operation mode of the vehicle to a teleoperation mode of the vehicle,
the trigger to switch from the driver operation mode of the vehicle to the teleoperation mode is based on an emotional state of a rider of the vehicle,
the teleoperation request includes identification information of the vehicle, and
the teleoperation device is selected to provide the driving assistance from a plurality of teleoperation devices based on a comparison of teleoperation cost values associated with the plurality of teleoperation devices,
the teleoperation cost values are associated with a plurality of teleoperation servers,
each teleoperation server of the plurality of teleoperation servers is associated with the plurality of teleoperation devices,
the teleoperation device of the plurality of teleoperation devices is associated with a teleoperator of a plurality of teleoperators, and
each teleoperation cost value of the teleoperation cost values is a cost of driving the vehicle in the teleoperation mode by a respective teleoperation device of the plurality of teleoperation devices;
receive one or more signals captured by a plurality of sensors associated with the vehicle;
control the display screen to display the received one or more signals;
receive one or more control inputs based on the displayed one or more signals, wherein
the one or more control inputs are received based on the switch of the driver operation mode of the vehicle to the teleoperation mode, and
the switch is based on the emotional state of the rider of the vehicle and the selected teleoperation device; and
transmit one or more vehicular instructions to a vehicle control system of the vehicle based on the received one or more control inputs.

21. The teleoperation device according to claim 20, further comprising a first plurality of control elements, wherein the circuitry is further configured to:
- control the display screen to display a second plurality of control elements based on the identification information of the vehicle included in the received teleoperation request; and
- receive the one or more control inputs through at least one of the first plurality of control elements or the second plurality of control elements.

22. The teleoperation device according to claim 20, wherein the circuitry is further configured to receive an incentive value from a teleoperation server of the plurality of teleoperation servers associated with the vehicle.

\* \* \* \* \*